US009857205B2

(12) United States Patent
Martin

(10) Patent No.: US 9,857,205 B2
(45) Date of Patent: Jan. 2, 2018

(54) ENCODER SYSTEM WITH A DESIRED RADIAL ALIGNMENT AND AXIAL GAP

(71) Applicant: Quantum Devices, Inc., Barneveld, WI (US)

(72) Inventor: Todd S. Martin, Dodgeville, WI (US)

(73) Assignee: Quantum Devices, Inc., Barneveld, WI (US)

( * ) Notice: Subject to any disclaimer, the term of this patent is extended or adjusted under 35 U.S.C. 154(b) by 360 days.

(21) Appl. No.: 14/527,892

(22) Filed: Oct. 30, 2014

(65) Prior Publication Data

US 2015/0122983 A1 May 7, 2015

Related U.S. Application Data

(60) Provisional application No. 61/900,682, filed on Nov. 6, 2013.

(51) Int. Cl.
*G01D 5/347* (2006.01)
*G01D 5/244* (2006.01)

(52) U.S. Cl.
CPC ..... *G01D 5/34707* (2013.01); *G01D 5/24442* (2013.01); *G01D 5/3473* (2013.01)

(58) Field of Classification Search
CPC .. G01D 5/34707; G01D 5/3473; G01D 5/347; G01D 11/245; G01D 5/24428; G01D 5/24433; G01D 5/24442
USPC ...... 250/239, 231.1, 231.13, 231.14, 231.15; 33/1 L, 1 N, 1 M, 1 PT; 341/11, 13; 356/615, 616, 622
See application file for complete search history.

(56) References Cited

U.S. PATENT DOCUMENTS

| | | | |
|---|---|---|---|
| 4,475,034 A * | 10/1984 | Maddox | H03M 1/1066 250/231.16 |
| 4,691,101 A | 9/1987 | Leonard | |
| 4,904,861 A | 2/1990 | Epstein et al. | |
| 4,998,013 A | 3/1991 | Epstein et al. | |
| 5,708,496 A | 1/1998 | Barnett et al. | |
| 6,563,108 B1 | 5/2003 | Stevens et al. | |
| 6,608,300 B2 | 8/2003 | Meschko | |
| 7,205,530 B2 | 4/2007 | Jones | |
| 7,601,948 B1 | 10/2009 | Setbacken et al. | |
| 7,939,795 B2 * | 5/2011 | Powell | G01D 5/34707 250/231.13 |

(Continued)

OTHER PUBLICATIONS

Z-Wrap Gold Elastomeric Connectors; Z-Axis Connector Company, Warminster, PA; www.zaxisconnector.com; Oct. 16, 2013; 1 pg.

(Continued)

*Primary Examiner* — Que T Le
*Assistant Examiner* — Jennifer Bennett
(74) *Attorney, Agent, or Firm* — Michael Best & Friedrich LLP

(57) ABSTRACT

An encoder system includes a disc coupled to a hub, the disc including a sensible member. The encoder system also includes a sensor operable to cooperate with the sensible member to sense an operating parameter of the disc, and a base assembly movable relative to the hub. A portion of the sensor is coupled for co-movement with the base assembly and movable between a first position in which the portion of the sensor is a first axial distance from the disc and a second position in which the portion of the sensor is a second axial distance from the disc, the second axial distance falling within a desired operating range.

26 Claims, 21 Drawing Sheets

(56) References Cited

U.S. PATENT DOCUMENTS

| | | | |
|---|---|---|---|
| 8,181,353 B2* | 5/2012 | Driker | G01D 5/34738 |
| | | | 33/1 PT |
| 2008/0054765 A1* | 3/2008 | Siraky | G01D 5/24442 |
| | | | 310/68 B |
| 2010/0038527 A1 | 2/2010 | Madore | |
| 2011/0197212 A1* | 8/2011 | Yoo | G11B 19/28 |
| | | | 720/703 |

OTHER PUBLICATIONS

Z-Carbon LCD Connector; Z-Axis Connector Company, Warminster, PA; www.zaxisconnector.com/Z-Carbon-LCD-Elastomeric-Connectors.shtml; Oct. 16, 2013; 1 pg.
Z-Carbon LCD Elastomeric Connector, available at <http://www.zaxisconnector.com/Z-Carbon-LCD-Elastomeric-Connectors.shtml> on or before Oct. 16, 2013 (1 page).

* cited by examiner

ENCODER SYSTEM WITH A DESIRED RADIAL ALIGNMENT AND AXIAL GAP

CROSS-REFERENCE TO RELATED APPLICATIONS

This application claims priority to U.S. Provisional Application No. 61/900,682, filed Nov. 6, 2013, the entire contents of which are incorporated herein by reference.

FIELD OF THE INVENTION

The present application relates generally to an encoder system that measures rotational angular position, direction of rotation, and speed of rotation of a component such as a motor shaft.

BACKGROUND

Encoder systems typically include a signal-generating (e.g., light-generating) emitter, a sensor (e.g., optical sensor) that receives signals from the signal-generating emitter, and a rotating disc disposed between the signal-generating emitter and the sensor. The disc includes a plurality of openings through which the signals from the signal generating emitter pass to the sensor. By measuring the signals received through the rotating disc, it is possible to determine a rotational angular position, direction of rotation, as well as speed, of the rotating disc.

SUMMARY

In accordance with one construction, an encoder system includes a disc coupled to a hub and including a sensible member. The encoder system also includes a sensor operable to cooperate with the sensible member to sense an operating parameter of the disc, and a base assembly movable relative to the hub. A portion of the sensor is coupled for co-movement with the base assembly and movable between a first position in which the portion of the sensor is a first axial distance from the disc and a second position in which the portion of the sensor is a second axial distance from the disc, the second axial distance falling within a desired operating range.

In accordance with another construction, an encoder system includes an alignment ring including a first surface and a plurality of projections extending from the first surface to define a second surface. The encoder system also includes a disc coupled to a hub for co-rotation, a sensor positioned adjacent the disc, and a base fixedly coupled to the sensor to support the sensor. The encoder system also includes a printed circuit board fixedly attached to the base, the printed circuit board including a third surface. The printed circuit board is rotatable between a first position in which the second surface and the third surface are engaged and a second position in which the first surface and the third surface are engaged to move the sensor between a first axial position in which the sensor is spaced a first distance from the disc and a second axial position in which the sensor is spaced a second distance from the disc.

In accordance with another construction, a method of assembling an encoder system includes connecting a disc to a hub for co-rotation about an axis, the disc including a sensible element, positioning a sensor in an assembly position adjacent the sensible element, supporting the sensor using a base assembly, and moving the base assembly from a first position in which the sensor is in the assembly position to a second position in which the sensor is in an operating position and is spaced axially from the disc.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
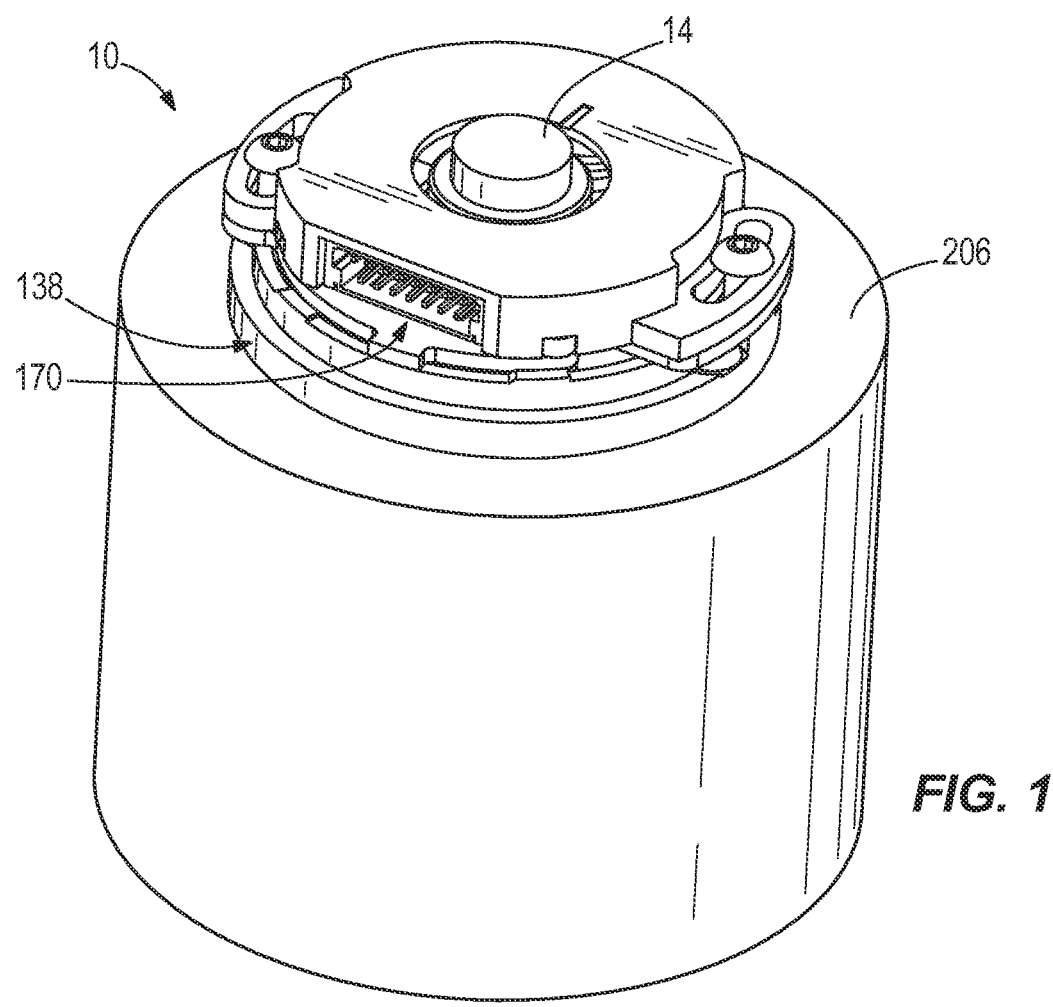
FIG. 1 is a top perspective view of a fully assembled encoder system according to one construction of the invention.
Figure 2:
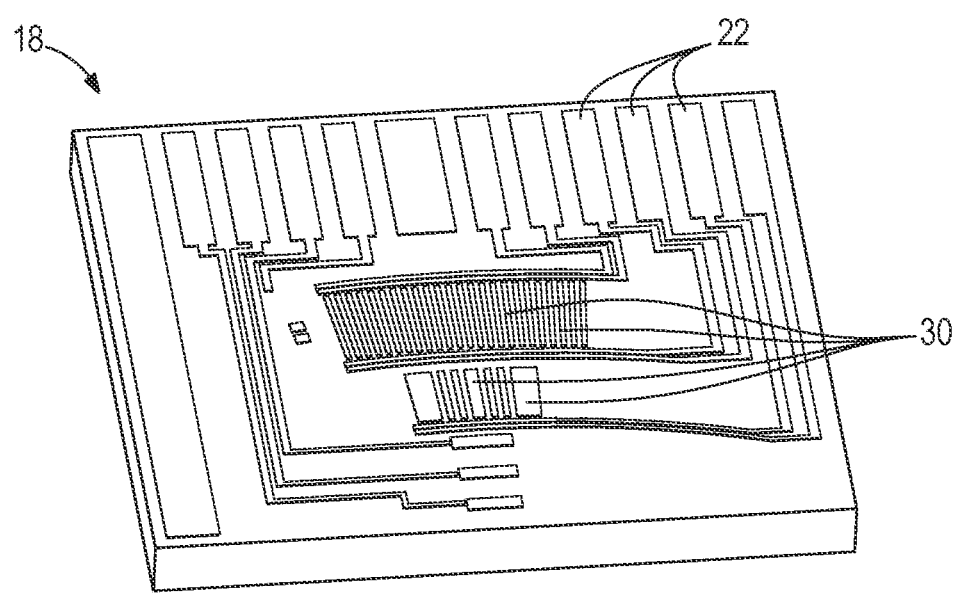
FIG. 2 is a top perspective view of a sensor of the encoder system in the form of an optical sensor.
Figure 3:
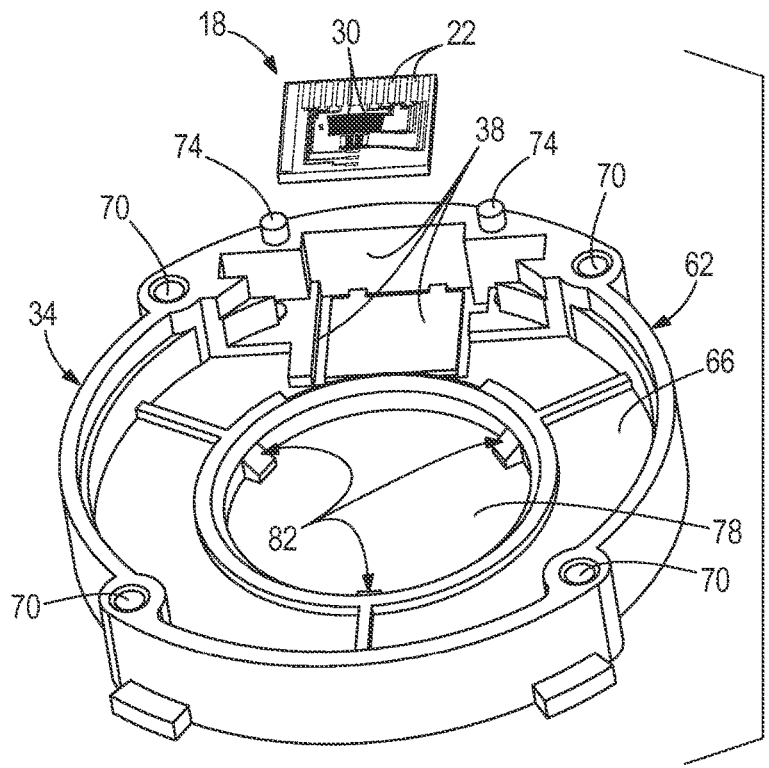
FIG. 3 is a top perspective view of the sensor and a base of the encoder system.
Figure 4:
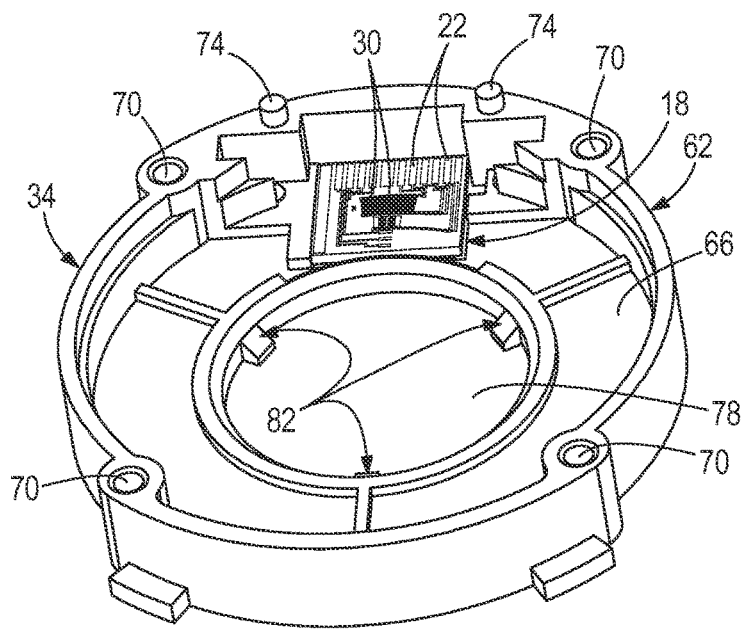
FIG. 4 is a top perspective view of the sensor assembled to the base.

FIG. 1 illustrates an encoder system 10 for measuring rotational angular position, direction of rotation, and speed of rotation of a component, such as a motor shaft 14. While the illustrated embodiments are in the context of an encoder system 10 for a motor shaft 14, the encoder system 10 may be used in conjunction with other components (e.g., other shafts) other than a motor shaft 14.

With reference to FIGS. 2-6, the system 10 includes a sensor 18. The sensor 18 is an optical sensor (e.g., similar to a photo diode array). The sensor 18 includes a plurality of connector pads 22 that couple to an electrical connector 26 (FIGS. 5 and 6), and a plurality of optical sensing areas 30 that receive an optical signal.

With reference to FIGS. 3-6, the sensor is coupled to a base 34. The base 34 is a molded component having molded surfaces 38 (FIG. 3) sized and shaped to receive and abut the sensor 18. The sensor 18 includes adhesive (not shown) on one or more sides of the sensor 18 to bond the sensor 18 to the base 34.

Figure 5:
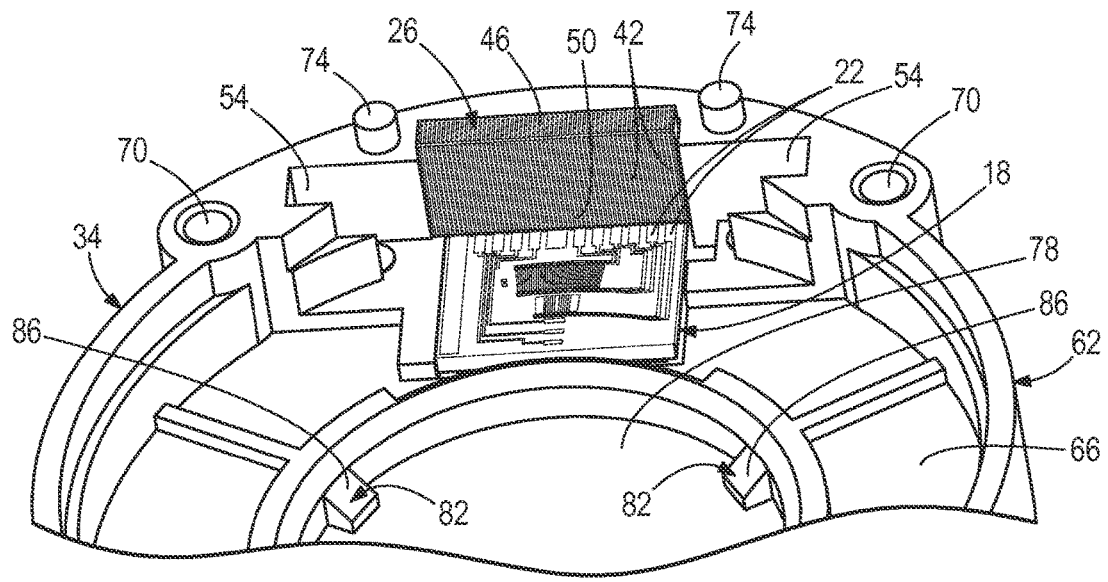
FIG. 5 is a top perspective view of the assembled sensor and base, along with an electrical connector of the encoder system.
Figure 6:
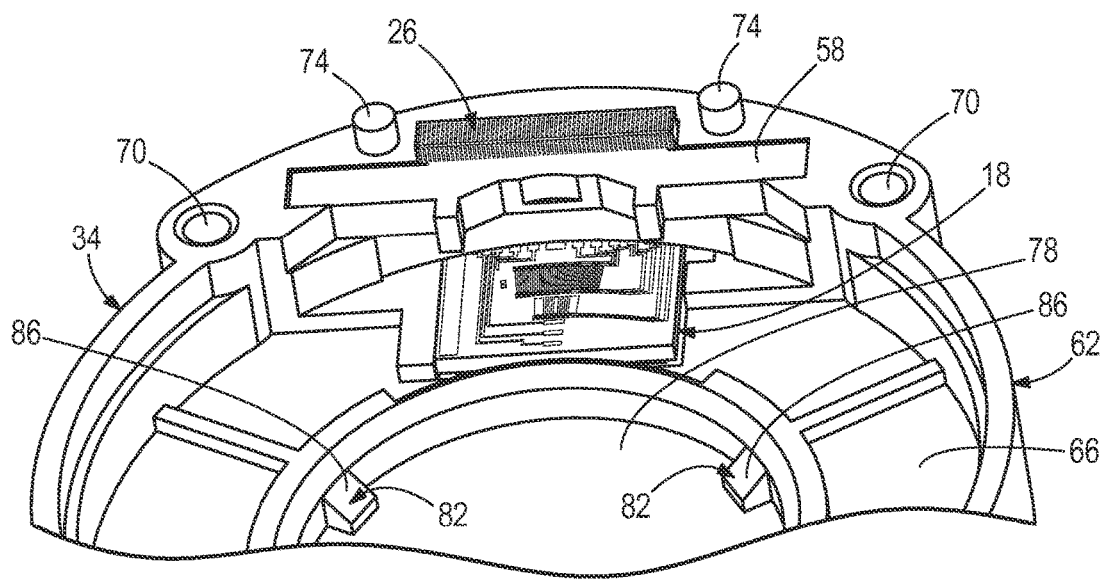
FIG. 6 is a top perspective view of the assembled sensor, base member, and electrical connector, along with a retainer of the encoder system.

With reference to FIGS. 5 and 6, the electrical connector 26 is coupled to the sensor 18, and extends alongside at least one of the surfaces 38. The electrical connector 26 is an elastomer connector having a plurality of wires 42 extending from a top 46 to a bottom 50 of the electrical connector 26 and to the connector pads 22. The wires 42 provide multiple isolated electrical connections. Other constructions include different structures for the electrical connector 26, such as a set of individual wires, or a flex circuit.

With continued reference to FIGS. 5 and 6, the base 34 includes two recessed areas 54 that receive and hold ends of a retainer 58. The retainer 58 constrains movement of the electrical connector 26. The retainer 58 extends across a portion of the electrical connector 26.

With reference to FIGS. 3-6, the base 34 includes a generally circumferentially-extending outer peripheral wall 62 that is raised relative to an interior surface 66, and extends circumferentially about the interior surface 66. The peripheral wall 62 includes a plurality of openings 70. Four openings 70 are illustrated, although other constructions include different numbers of openings 70. Each of the openings 70 is threaded for receiving a correspondingly threaded fastener for coupling another component onto the base 34.

The peripheral wall 62 also includes a plurality of projections 74. Two projections 74 are illustrated, although other constructions include different number of projections 74. Each of the projections 74 is used to guide and couple another component onto the base 34.

With continued reference to FIGS. 3-6 and 25, the base 34 includes a central opening 78, and a plurality of flanges 82 disposed about the opening 78. The flanges 82 each have a tapered surface 86 (FIGS. 5 and 6) extending generally in a downward, and central, direction, toward a central axis 90 (FIG. 25) of the opening 78. Three flanges 82 are illustrated. The flanges 82 are spaced apart generally equally (i.e., 120 degrees) about the opening 78. Other constructions include different numbers, shapes, and locations of the flanges 82. In some constructions (e.g., as illustrated in FIGS. 25, 26, 28, and 29) a single flange 82 with a tapered surface 86 extends entirely around, or substantially entirely around the central opening 78. In some constructions no flange 82 is provided, but a tapered surface 86 on the base 34 still extends at least partially around the central opening 78.

When the sensor 18 is coupled to the base 34, the optical sensing areas 30 are positioned into radial alignment with central opening 78 and with the central axis 90.

Figure 7:
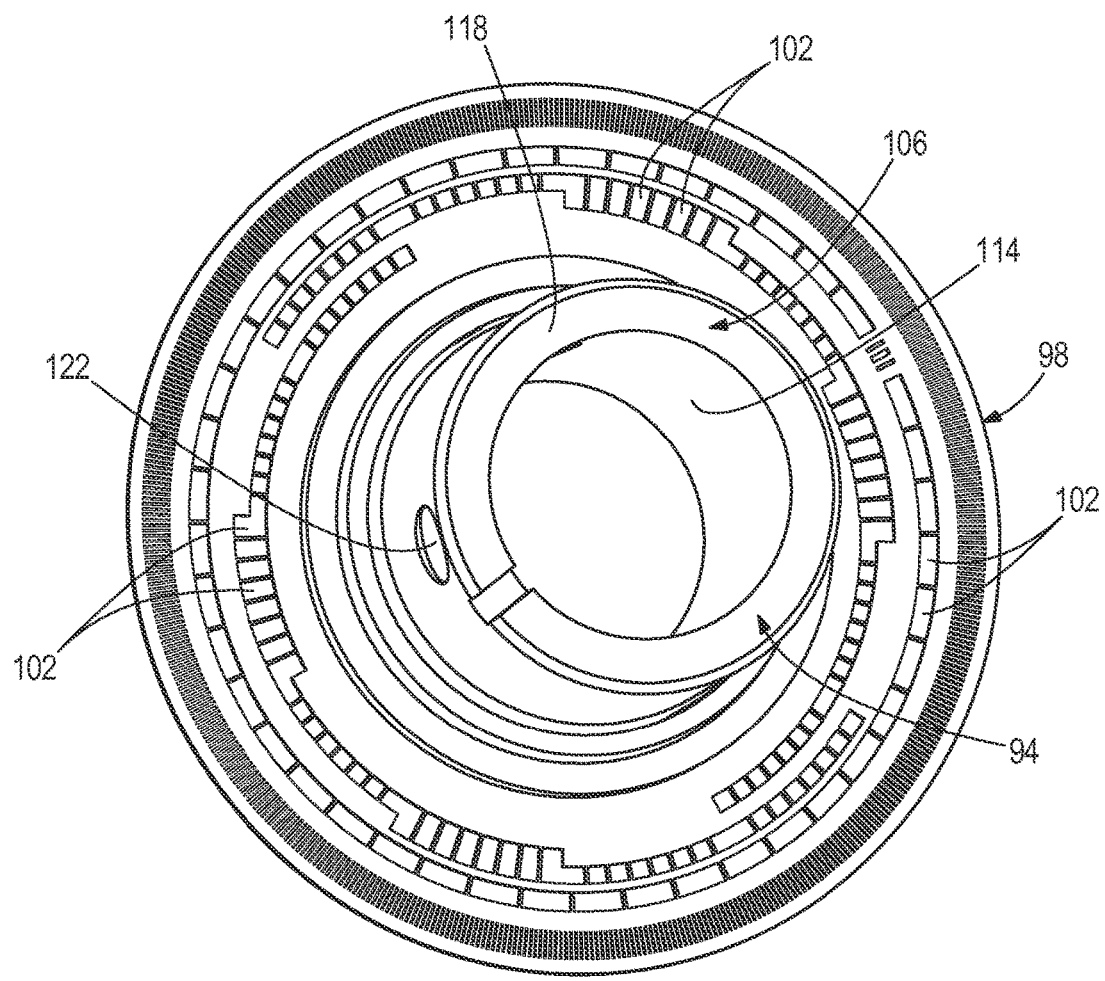
FIG. 7 is a top perspective view of a hub of the encoder system, including a disc having a plurality of openings.
Figure 8:
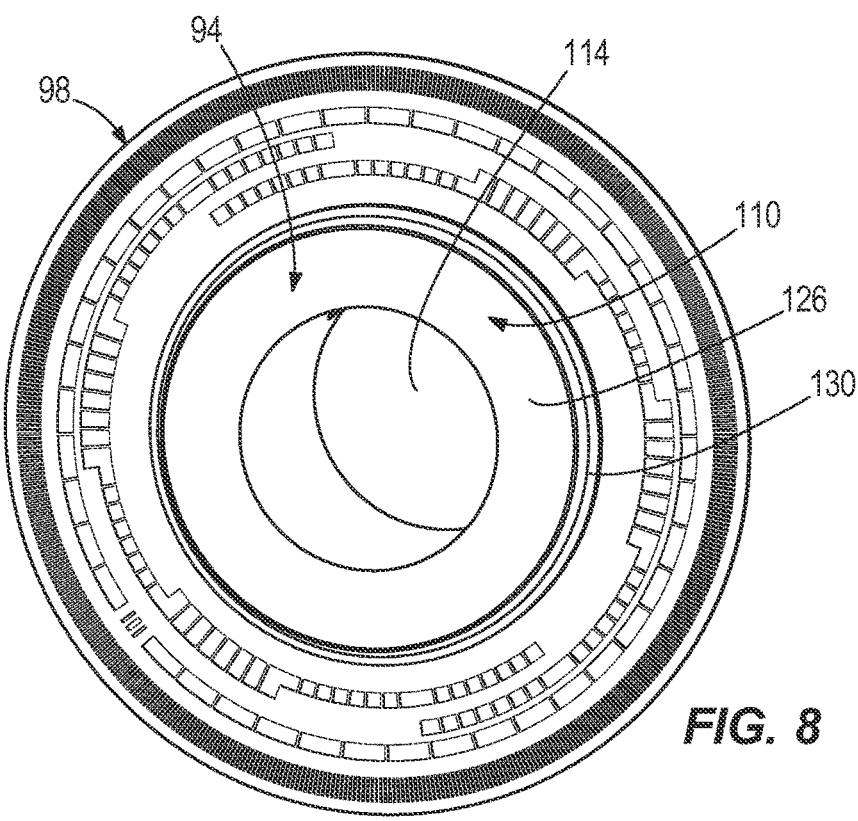
FIG. 8 is a bottom perspective view of the hub.
Figure 9:
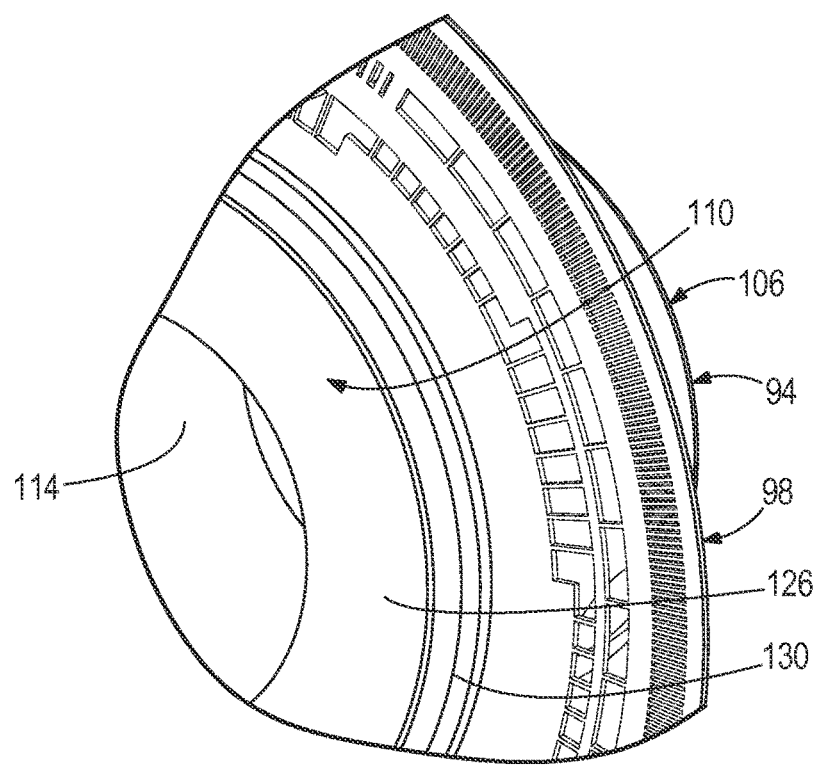
FIG. 9 is an enlarged partial view of the bottom of the hub.

With reference to FIGS. 7-9, the system 10 further includes a hub 94 that couples to the shaft 14, and a disc 98 that is coupled to (e.g., integrally formed as one piece with) the hub 94. The illustrated disc 98 is made of metal, and includes at least one sensible member 102 (e.g., a plurality of patterned openings spaced both radially and circumferentially about the disc 98, magnets spaced about the disc 98, or other openings or structures that provide indications of an operating parameter of the disc 98 and shaft 14, the operating parameter including for example a position, speed, and/or direction of rotation of the disc 98 and shaft 14). The disc 98 extends radially from the hub 94 about an outer periphery of the hub 94. Other constructions include different materials and shapes for the disc 98, as well as other numbers of and sizes of openings 102 than that illustrated.

The hub 94 includes a cylindrically-shaped top portion 106 (FIG. 7) and a cylindrically-shaped bottom portion 110 (FIGS. 8 and 9). The top portion 106 and the bottom portion 110 form an opening 114 through a center of the hub 94. The opening 114 is smaller in diameter than the opening 78.

As illustrated in FIG. 7, the top portion 106 includes a circumferentially-extending wall 118 having at least one circular opening 122 extending through the wall 118. The opening 122 provides access for insertion of a fastener to fixedly couple the hub 94 to the shaft 14. In some constructions the opening 122 is threaded.

Figure 25:
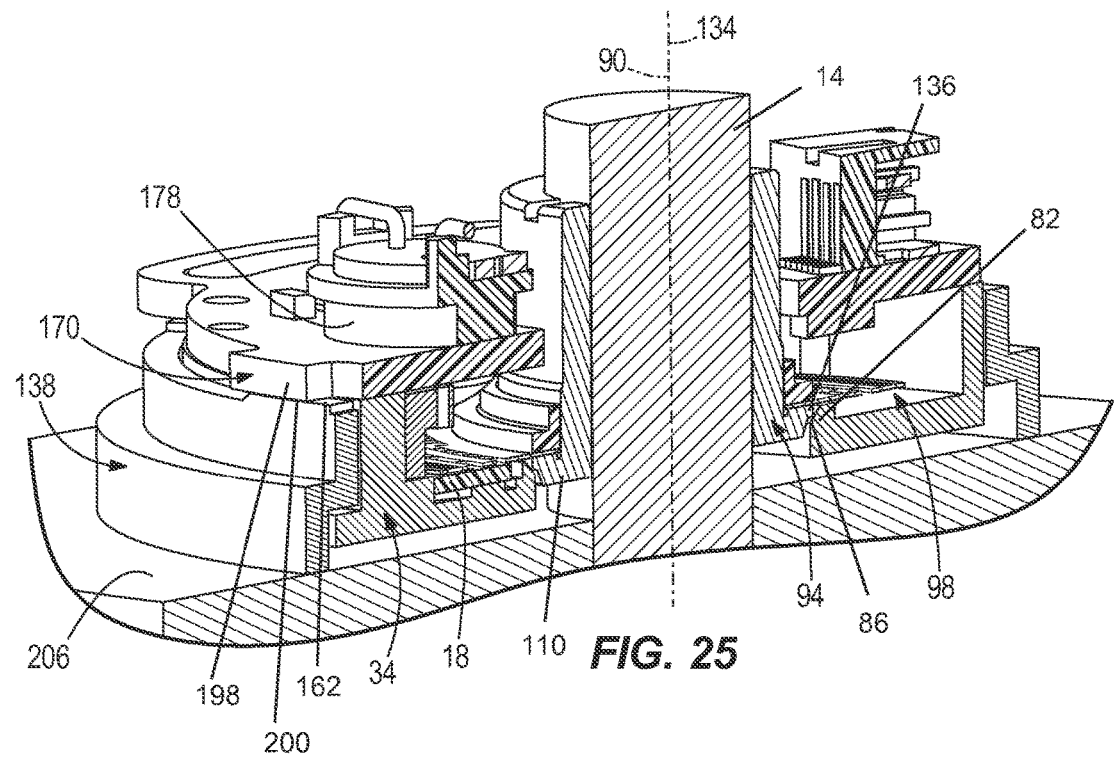
FIG. 25 is a cross-sectional view of the encoder system, illustrating the first position.
Figure 26:
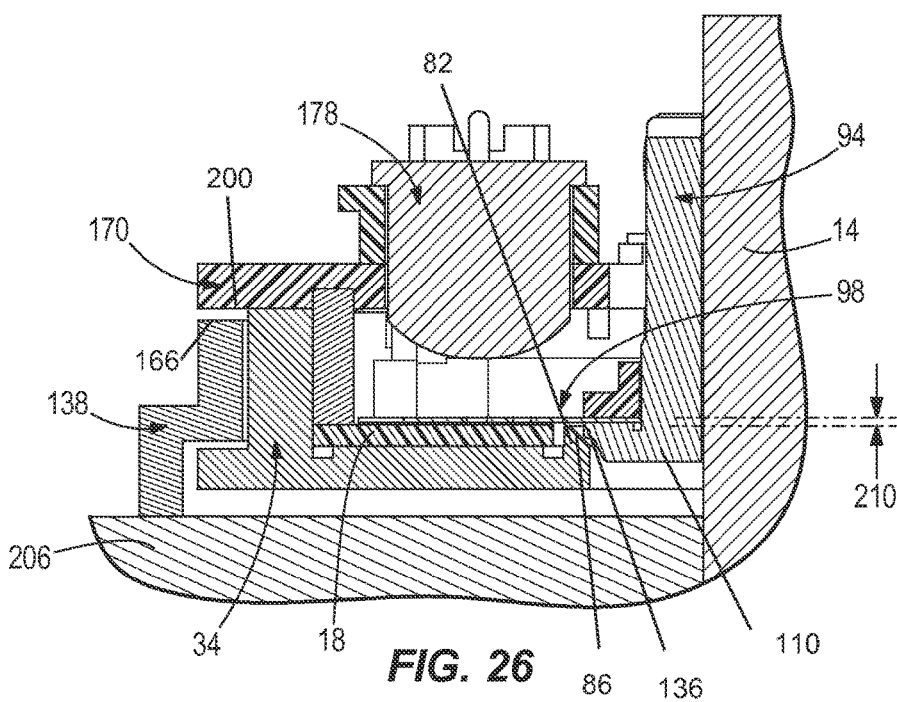
FIG. 26 is an enlarged, partial cross-sectional view of the first position, illustrating the relative positions of the sensor and disc.

As illustrated in FIGS. 8, 9, 25, and 26 the bottom portion 110 includes for example a circumferentially-extending wall 126 having a tapered, conical surface 130 (e.g., frustoconical, shown in FIGS. 8 and 9) or a radially extending ledge 136 (e.g., as shown in FIGS. 25 and 26). During assembly the bottom portion 110 extends generally in a downward, and central, direction, toward a central axis 134 (FIG. 25) of the opening 114.

Figure 10:
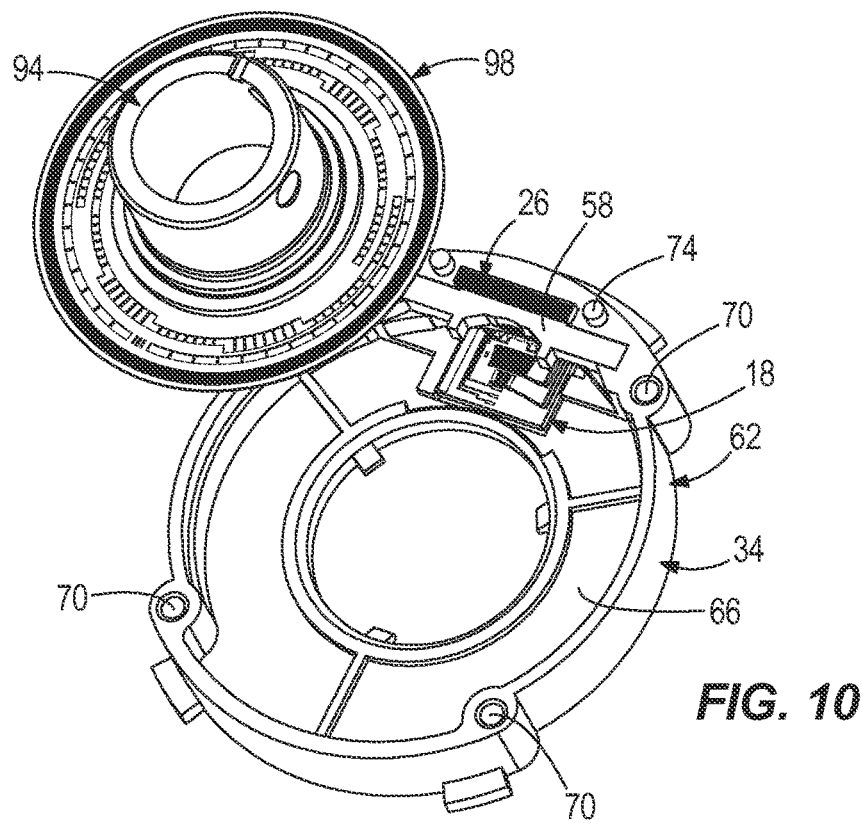
FIG. 10 is a top perspective view of the hub and the base.
Figure 11:
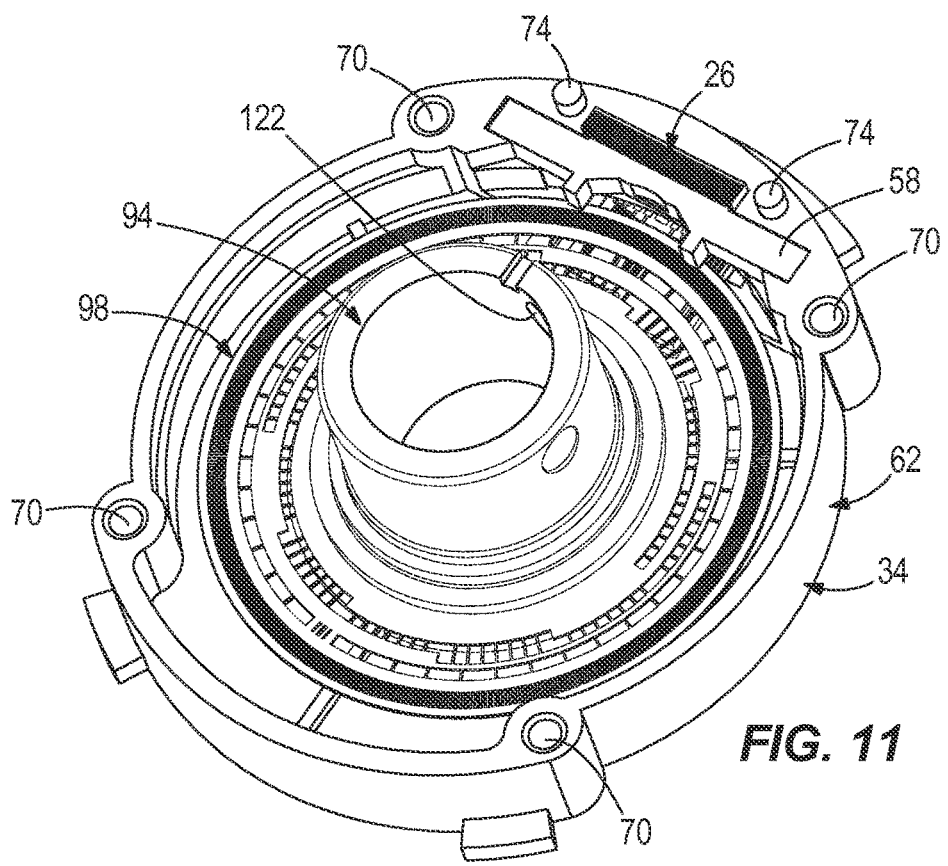
FIG. 11 is a top perspective view of the hub assembled to the base.
Figure 12:
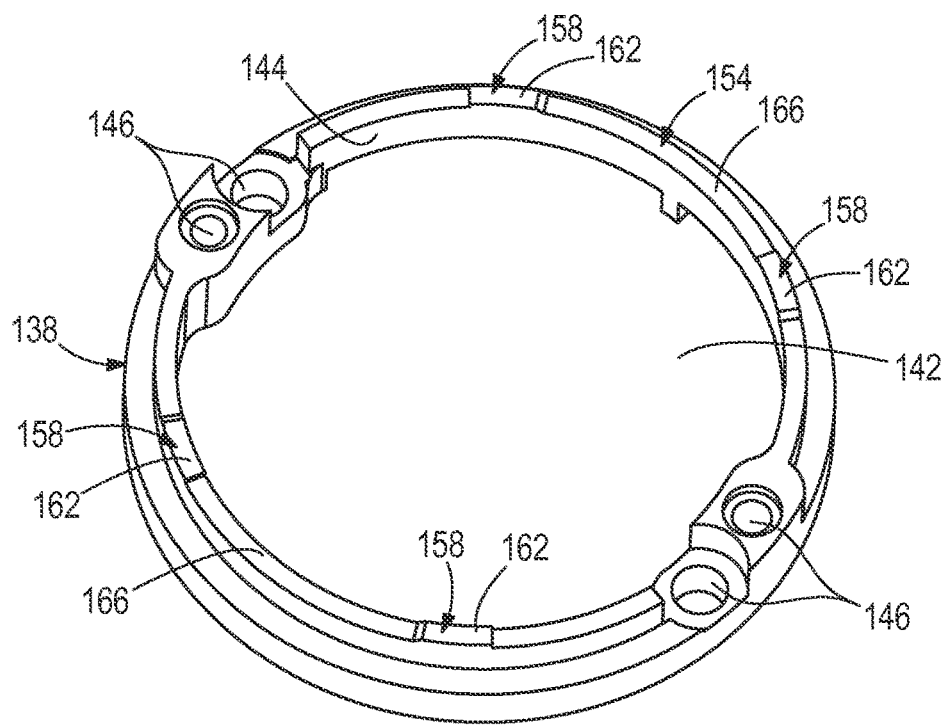
FIG. 12 is a top perspective view of an alignment ring of the encoder system.
Figure 13:
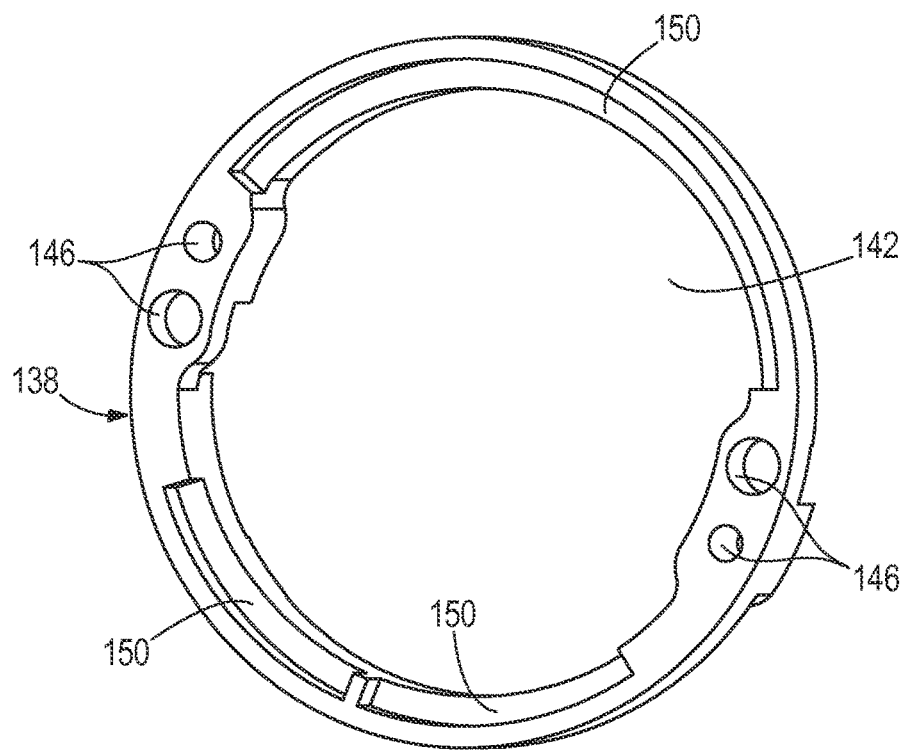
FIG. 13 is a bottom perspective view of the alignment ring.
Figure 14:
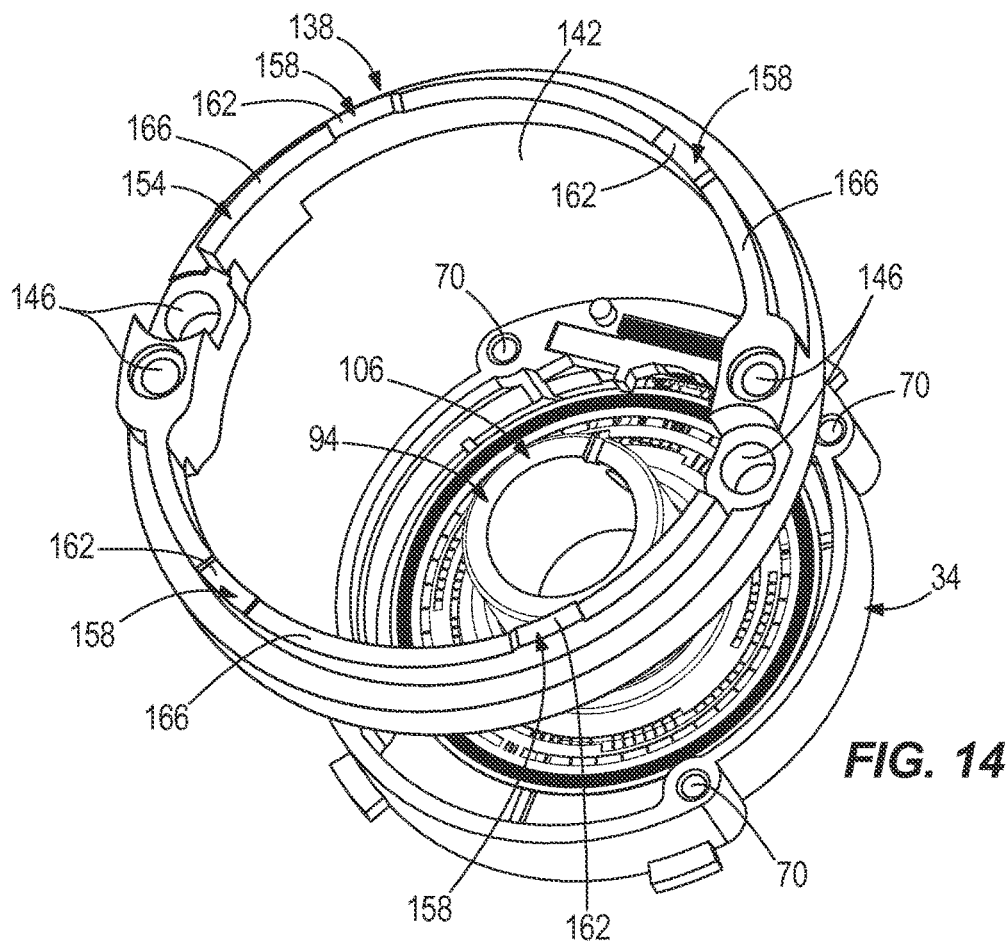
FIG. 14 is a top perspective view of the alignment ring and the assembled hub and base.
Figure 15:
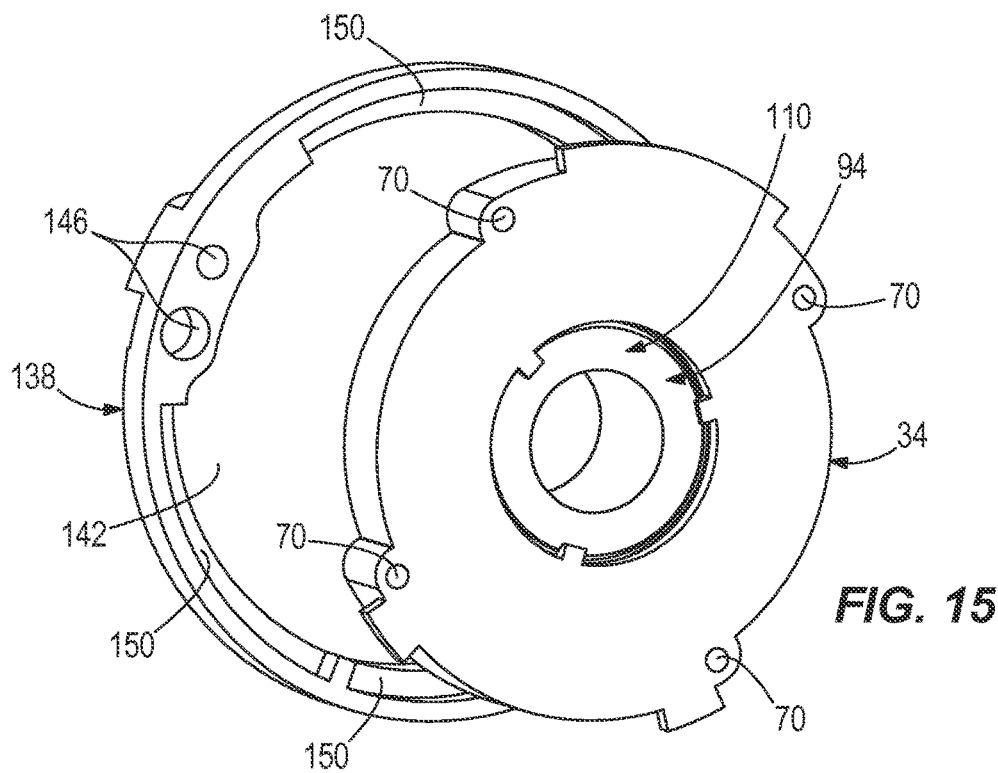
FIG. 15 is a bottom perspective view of the alignment ring and the assembled hub and base.
Figure 16:
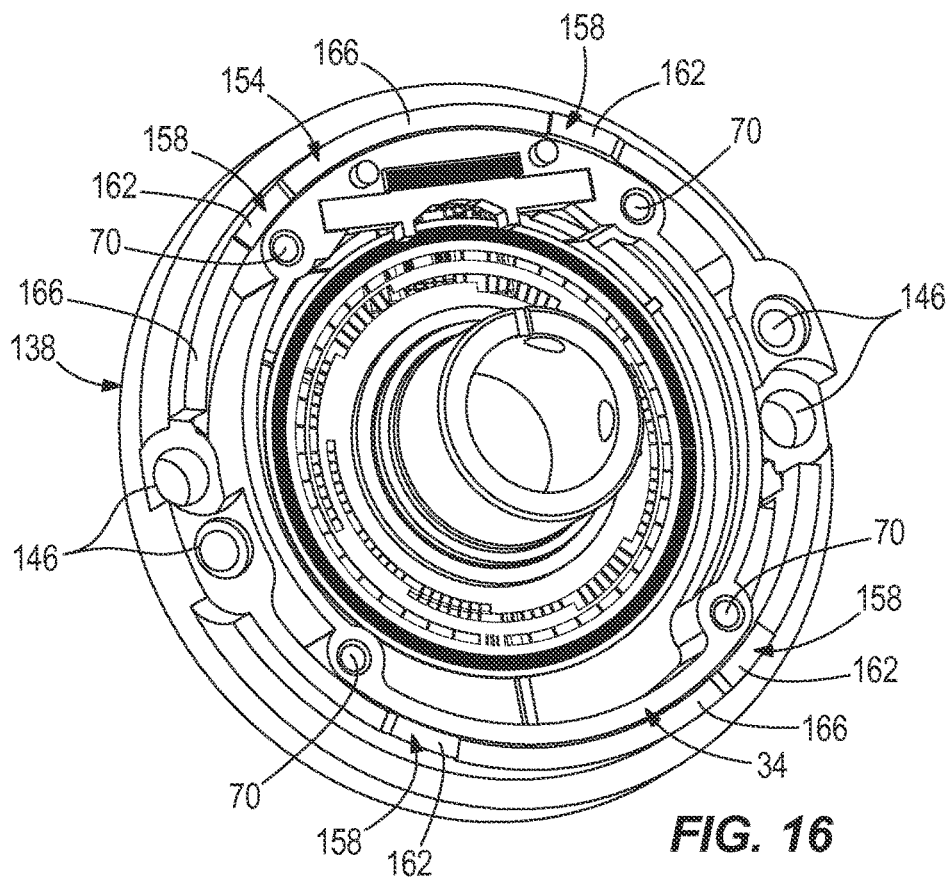
FIG. 16 is a top perspective view of the alignment ring assembled to the base.
Figure 17:
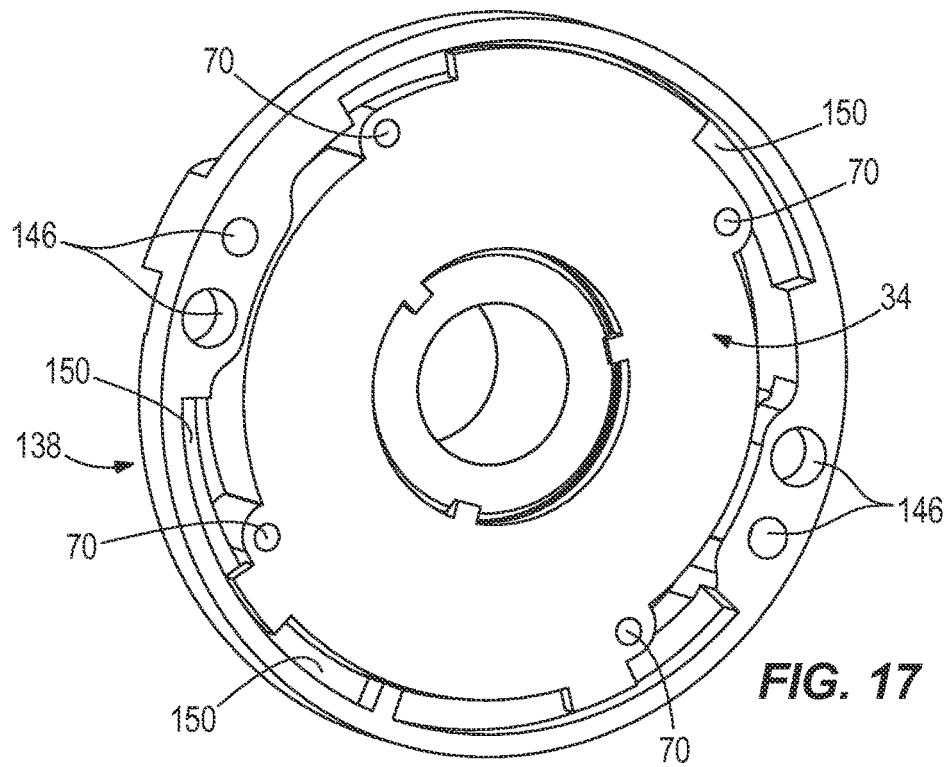
FIG. 17 is a bottom perspective view of the alignment ring assembled to the base.
Figure 18:
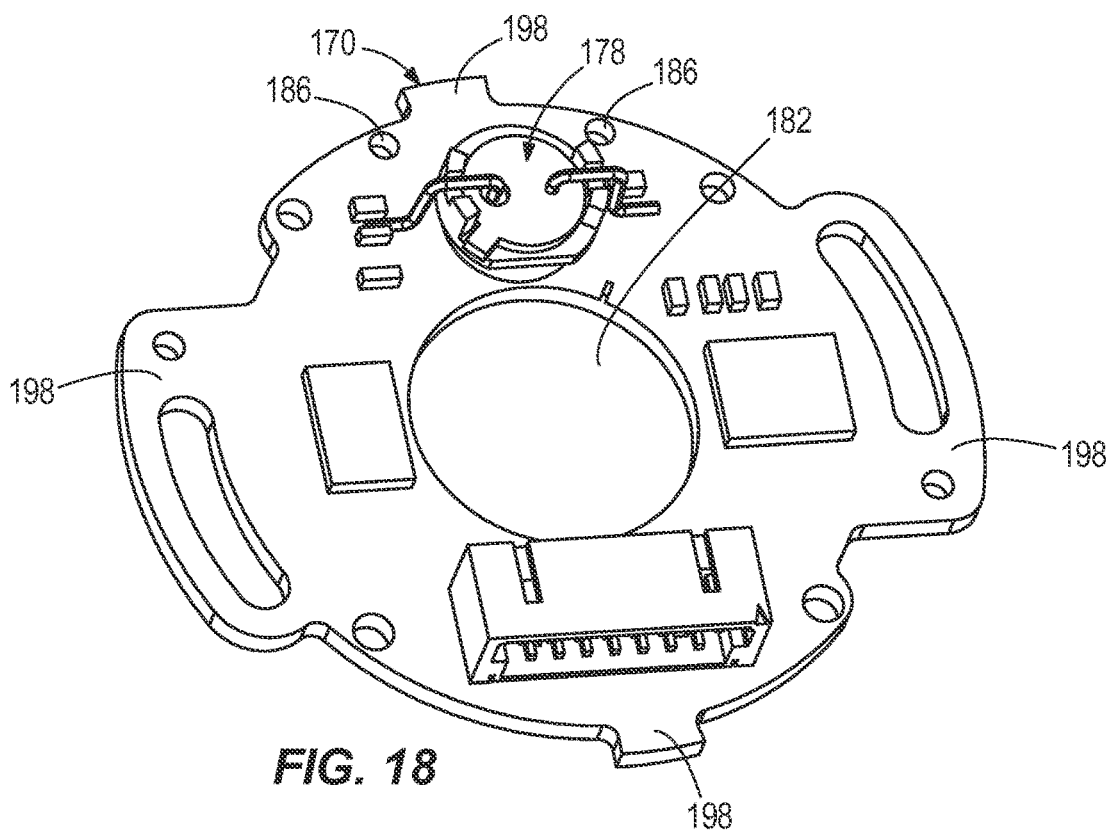
FIG. 18 is a top perspective view of a printed circuit board of the encoder system, including a signal-generating emitter in the form of a light-emitting diode.

With reference to FIGS. 10, 11, and 25 during assembly the bottom portion 110 of the hub 94 is pushed into the opening 78 of the base 34, such that the opening 114 of the hub 94 becomes concentrically aligned with the opening 78 of the base 34. For example, the hub 94 is pushed down until the ledge 136, the conical surface 130, or another surface of the hub 94 rests on the tapered surface 86 (as seen for example in FIG. 26, illustrating the ledge 136 resting on the tapered surface 86). Once assembled, a portion of the disc 98 rests above the sensor 18, as well as below a portion of the retainer 58, and the central axis 134 is aligned with the central axis 90 (FIG. 25). In some constructions, the retainer 58 is not coupled to the base 34 until after the bottom portion 110 of the hub 94 has been inserted through the opening 78 of the base 34.

With reference to FIGS. 12-17, the system 10 further includes an alignment ring 138 that couples to the base 34. The alignment ring 138 is generally circular, and includes a central opening 142 that is sized and shaped to receive the base 34, such that the base 34 abuts against or is disposed directly adjacent to an inside surface 144 (FIG. 12) of the alignment ring 138. The alignment ring 138 includes a plurality of openings 146 (e.g., threaded openings) for coupling the alignment ring 138 to one or more additional components of the system 10. Inner ledges 150 (FIGS. 13, 15, and 17) abut the base 34 or are disposed directly adjacent to the base 34 when the alignment ring 138 is coupled to the base 34 to retain the alignment ring 138 when the system 10 is assembled.

The alignment ring 138 also includes a raised, upper lip portion 154 (FIGS. 12, 14, 16) extending generally circumferentially about the opening 142, and a plurality of projections 158 extending from the lip portion 154. Four projections 158 are illustrated, although other constructions include different numbers of projections 158. The projections 158 each include a top, flat surface 162 that is spaced, and raised, from a generally parallel flat surface 166 along the lip portion 154.

Figure 19:
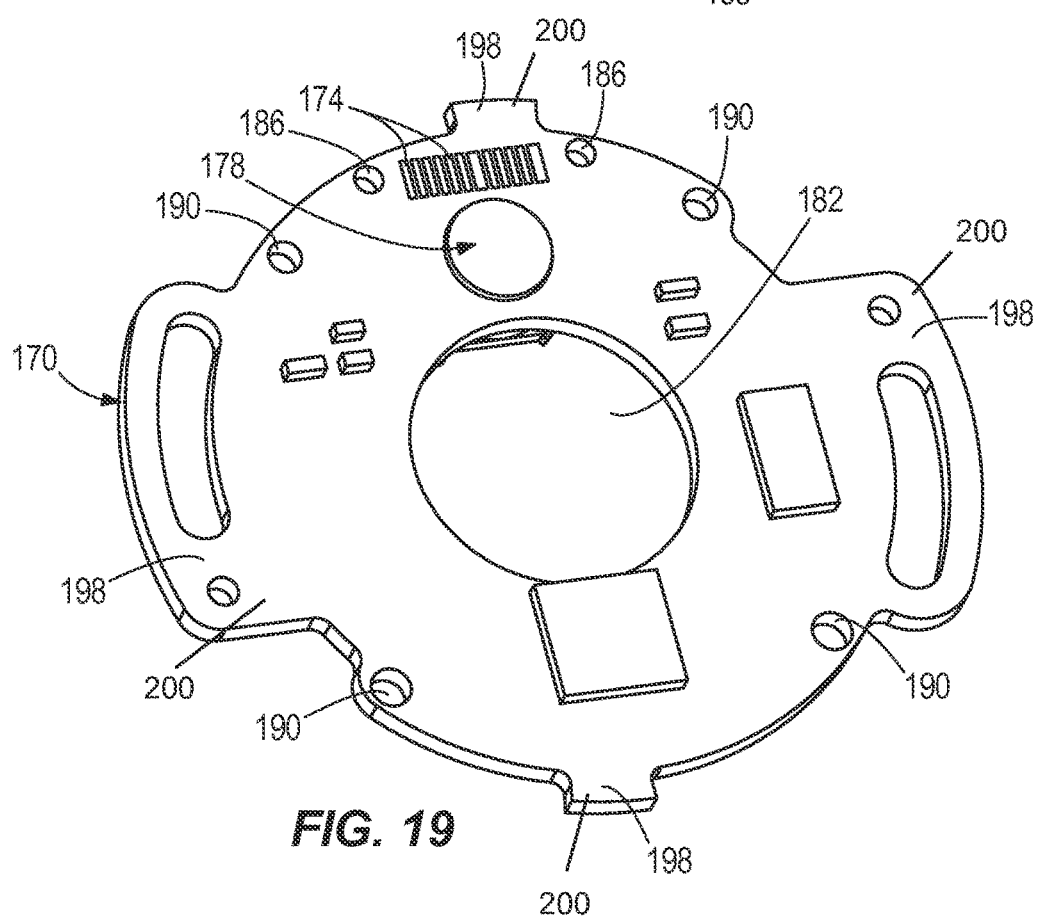
FIG. 19 is a bottom perspective view of the printed circuit board.
Figure 20:
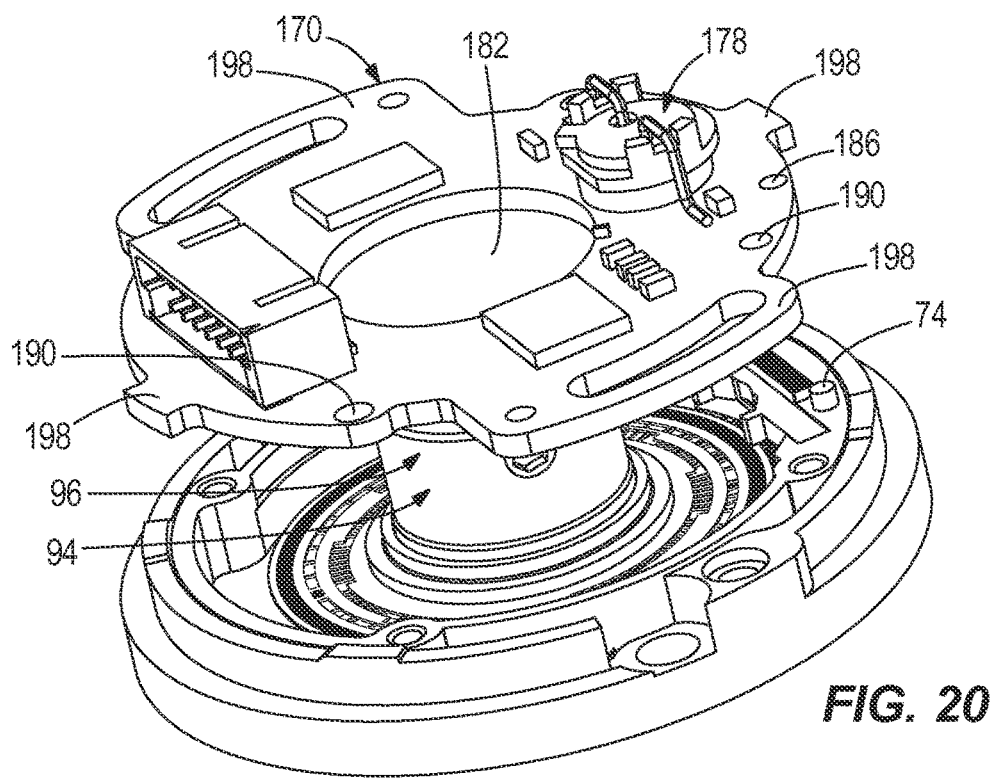
FIG. 20 is a top perspective view of the printed circuit board and base.
Figure 21:
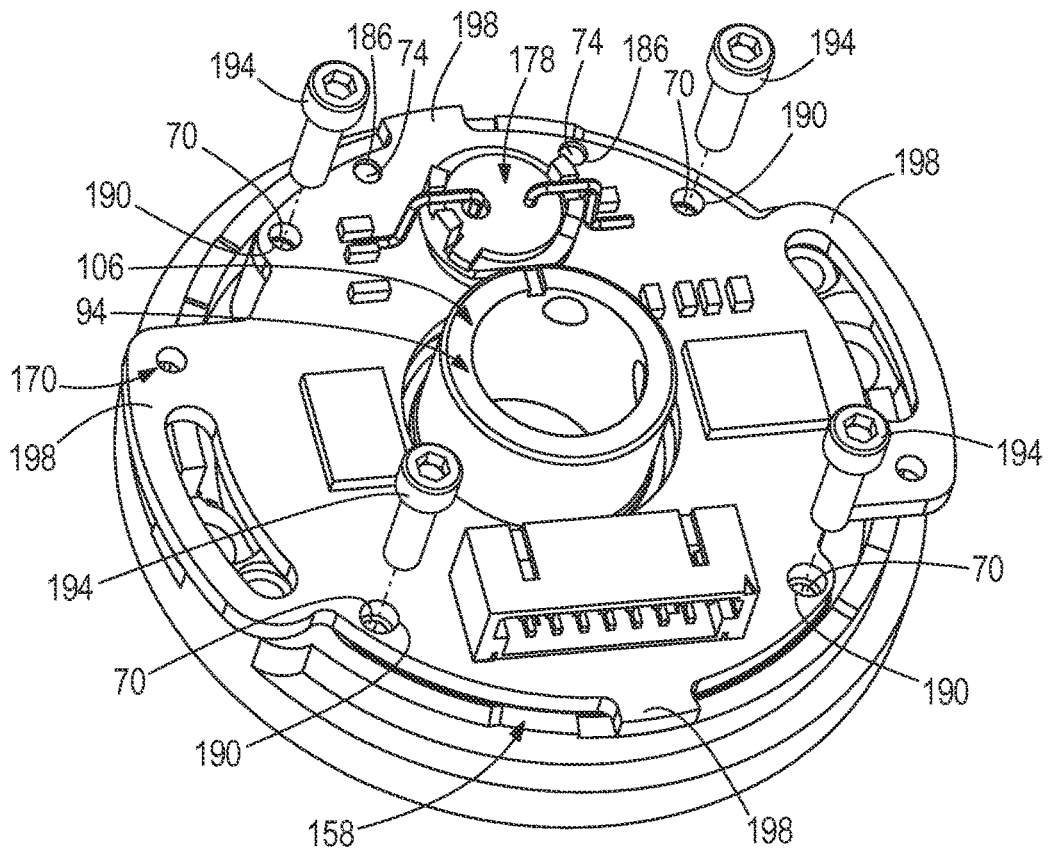
FIG. 21 is a top perspective view of the printed circuit board being assembled to the base.

With reference to FIGS. 18-21, the system 10 further includes a printed circuit board 170 that couples to the base 34. The base 34, printed circuit board 170, and sensor 18 define an overall base assembly for the system 10. The printed circuit board 170 includes a plurality of electronic circuitry components, including a set of connector pads 174 (FIG. 19). The connector pads 174 are sized and configured to couple to the electrical connector 26, so as to transmit electricity between the printed circuit board 170 and the sensor 18.

The printed circuit board 170 also includes a signal-generating emitter 178. The illustrated signal-generating emitter 178 is an LED that emits light toward the disc 94, and through the openings 102 to the optical sensing areas 30 on the sensor 18, where the sensor 18 converts the rotating projections of light to a corresponding electrical signal. In some constructions the optical sensing areas 30 on the sensor 18 described above are similar (or in some cases identical) in size and geometry to the patterned openings 102. U.S. Pat. No. 6,563,108, the entire contents of which are incorporated by reference herein, describes and illustrates examples of openings (e.g., regions 14) and optical sensing areas (e.g., optical receivers 18) on an encoder system.

With reference to FIGS. 18-21, the printed circuit board 170 includes a central opening 182. When the printed circuit board 170 is coupled to the base 34, the central opening 182 fits over and receives the top portion 106 of the hub 94. The printed circuit board 170 also includes a plurality of openings that are used to couple the printed circuit board 170 to the base 34. For example, the printed circuit board 170 includes openings 186 that are sized and shaped to receive the projections 74 on the base 34. The printed circuit board 170 also includes openings 190 that are sized and shaped to align with the openings 70 on the base 34, such that fasteners 194 (FIG. 21) may be passed through the openings 190 and 70 to couple the printed circuit board 170 to the base 34.

With continued reference to FIGS. 18-21, the printed circuit board 170 includes tabs 198 that extend radially away from the hub 94 and define surfaces 200 (FIG. 19). The illustrated construction includes four tabs 198. However, other constructions include different numbers and arrangements of tabs 198. In some constructions, the tabs 198 are disposed on another component of the base assembly (e.g., the base 34).

With reference to FIGS. 22-26, once the printed circuit board 170 has been coupled to the base 34, the printed circuit board 170, the base 34, and the hub 94 are then placed over the shaft 14, and are also rotated (e.g., as illustrated by the arrows in FIG. 22) relative to the alignment ring 138 until the tabs 198 on the printed circuit board 170 align with the projections 158 and the surfaces 200 rest on top of the surfaces 162 of the projections 158

Figure 24:
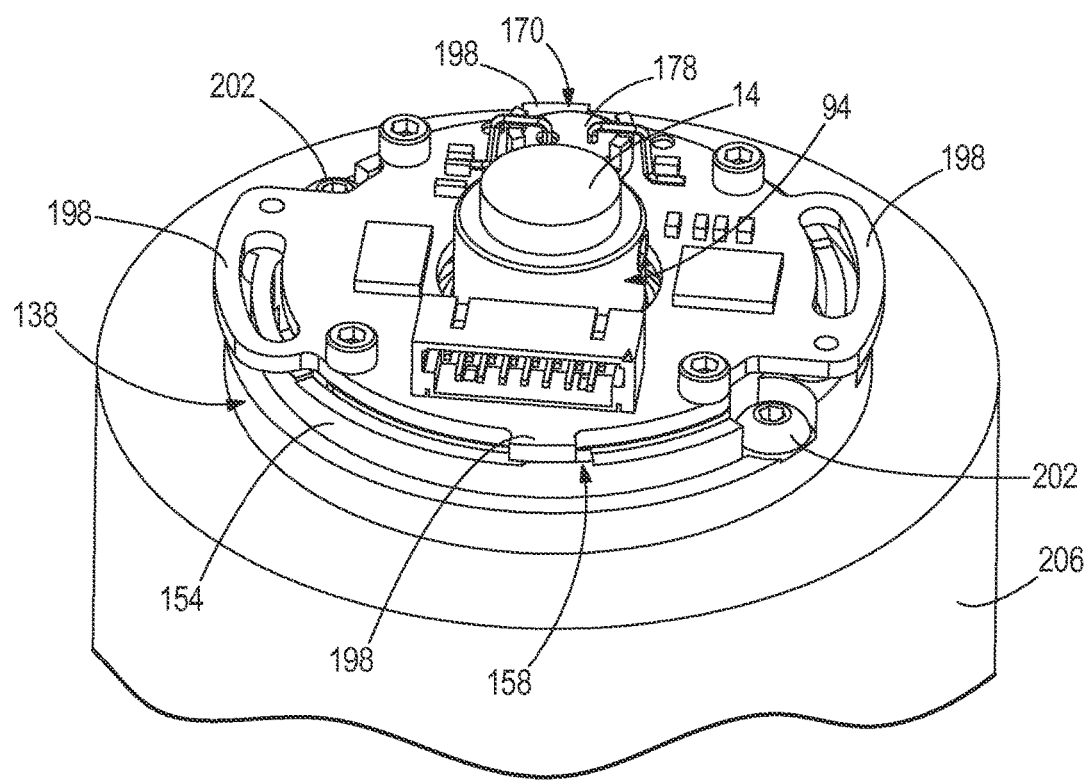
FIG. 24 is a top perspective view of the alignment ring assembled to a motor housing.

With reference to FIG. 24, downward pressure is then applied to the hub 94, forcing the tapered, conical surface 130 of the bottom portion 110 of the hub 94 to engage the tapered surfaces 86 on the flanges 82 of the base 34. This causes the printed circuit board 170 and the base 34 to align concentrically with the bottom portion 110 of the hub 94, and with the axes 90, 134. Because the alignment ring 138 has an inner diameter that closely approximates an outer diameter of the base 34, the alignment ring 138 also aligns itself concentrically with the bottom portion 110 of the hub 94, and with the axes 90, 134. This alignment of the printed circuit board 170, the base 34, and alignment ring 138 causes the sensor 18 to appropriately align itself (e.g., radially align itself) with the disc 94, such that light may be passed from the signal-generating emitter 178, through the openings 102 of the disc 98, and to the sensor 18 and the optical sensing areas 30.

Figure 23:
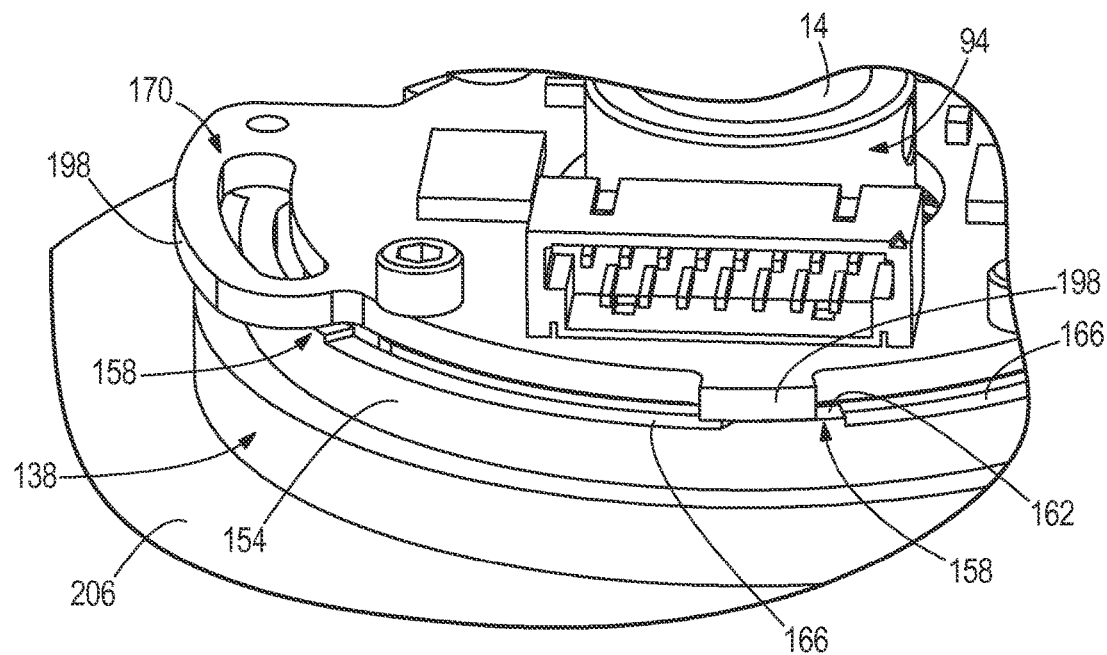
FIG. 23 is a partial, top perspective view of the printed circuit board having been rotated to a first position relative to the alignment ring, and positioned over the shaft.

With reference to FIG. 23, once the aforementioned alignment has occurred, set screws (not shown) are inserted through the opening 122 in the hub 94 to rigidly affix the hub 94 and disc 98 to the shaft 14. With the hub 94 affixed to the shaft 14, any rotational movement of the shaft 14 causes identical rotational movement of the hub 94 (and disc 98).

Figure 22:
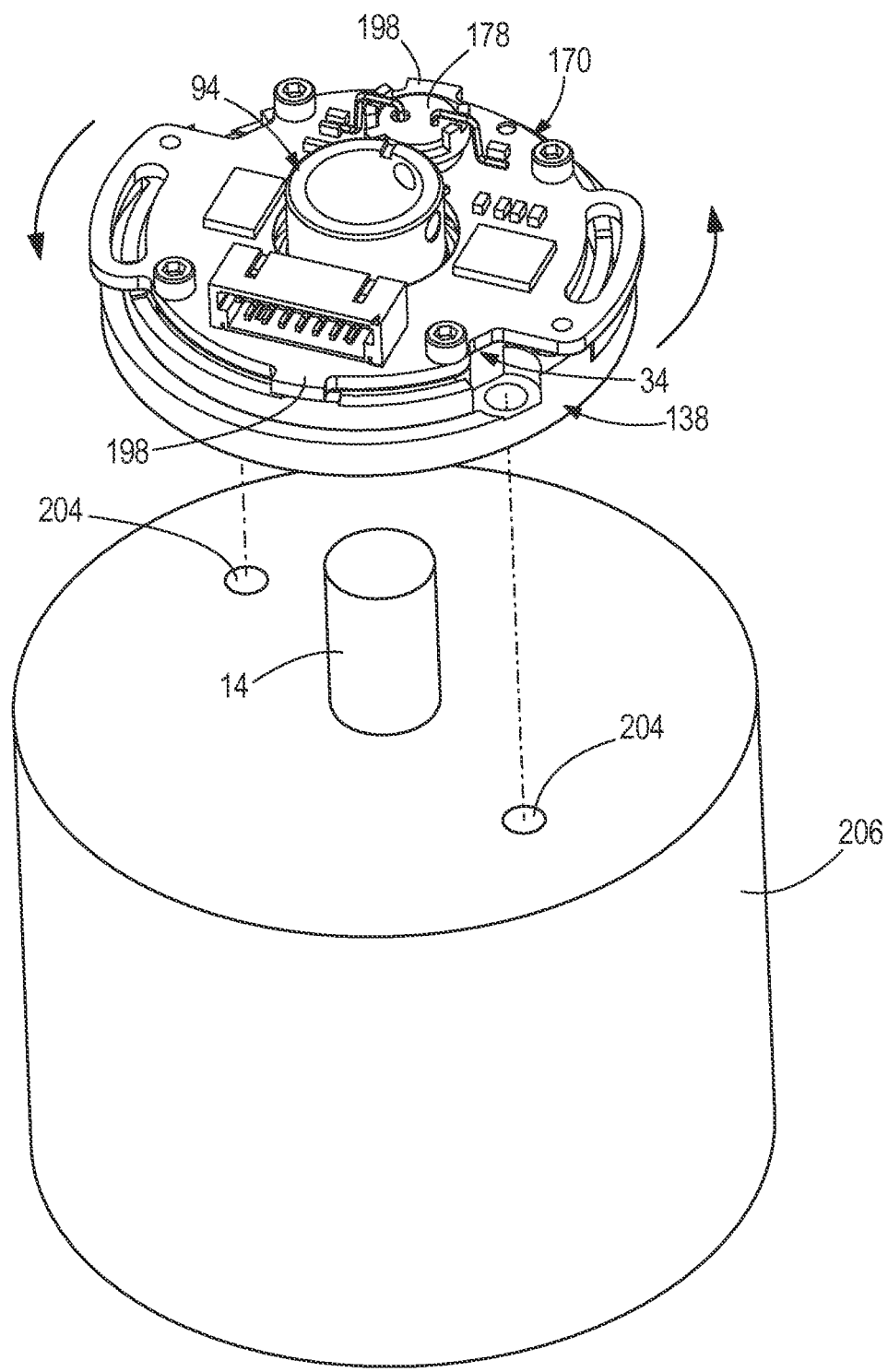
FIG. 22 is a top perspective view of the printed circuit board and a motor and shaft of the encoder system, the printed circuit board being rotated relative to the alignment ring.

With reference to FIGS. 22 and 24, two screws 202 are then inserted through the openings 146 in the alignment ring 138 and into openings 204 (FIG. 22) of a housing 206 to rigidly affix the alignment ring 138 to the housing 206. The housing 206 is a motor housing that houses the shaft 14, although in other constructions the housing 206 may be another type of housing, or may have another shape and size than that illustrated.

With reference to FIGS. 25 and 26, once the printed circuit board 170 has been rotated such that the tabs 198 rest on the projections 158, the alignment ring 138 has been affixed to the housing 206, and the downward pressure has been applied to the hub 94, the system 10 is in a first position. In this first position as illustrated in FIGS. 25 and 26, the sensor 18 and the disc 98 are separated by a gap 210 as measured along an axis parallel to that of central axes 90, 134. In some constructions the gap 210 is equal to or approximately 0 inches, such that the sensor 18 and disc 98 are in close contact with one another or are touching. In some constructions the gap 210 is less than 0.005 inches.

Figure 27:
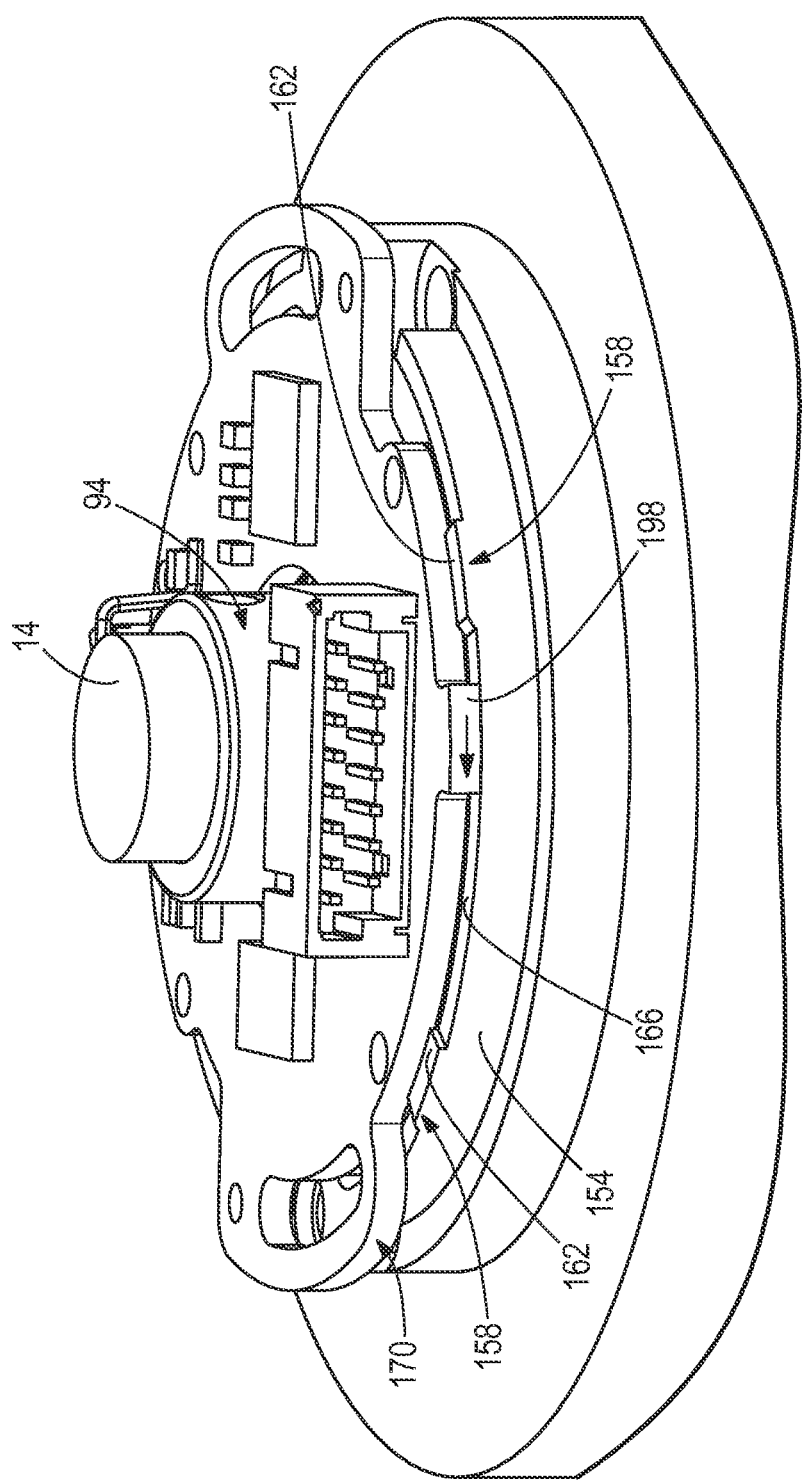
FIG. 27 is a partial, top perspective view of the printed circuit board having been rotated to a second position relative to the alignment ring.
Figure 28:
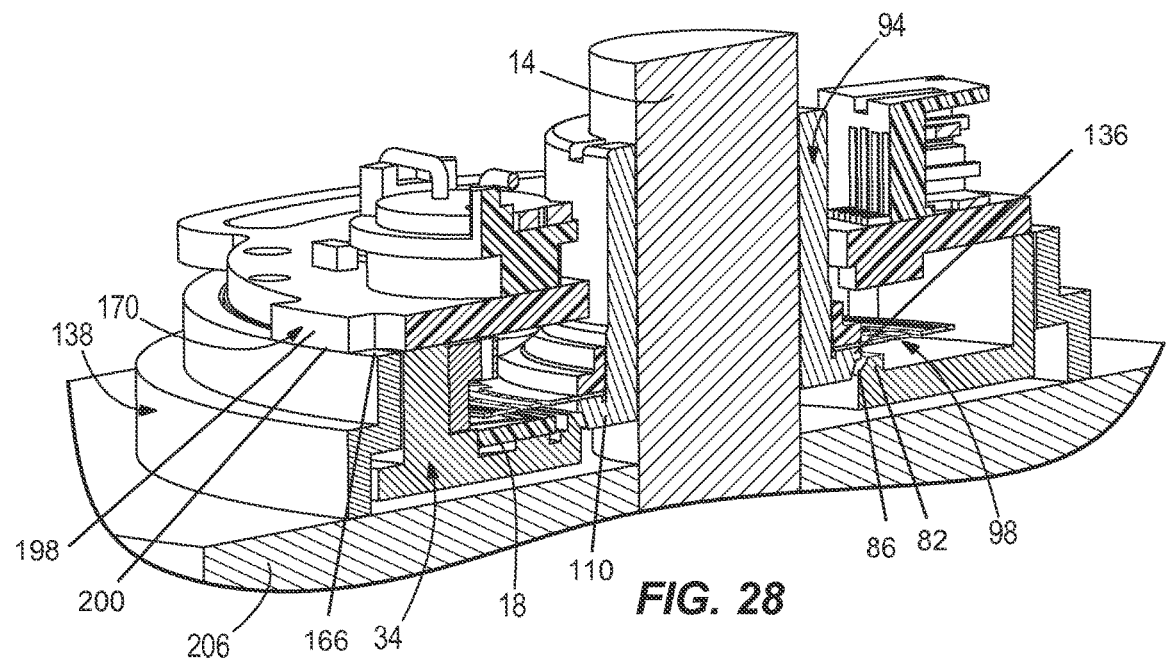
FIG. 28 is a cross-sectional view of the encoder system, illustrating the second position.
Figure 29:
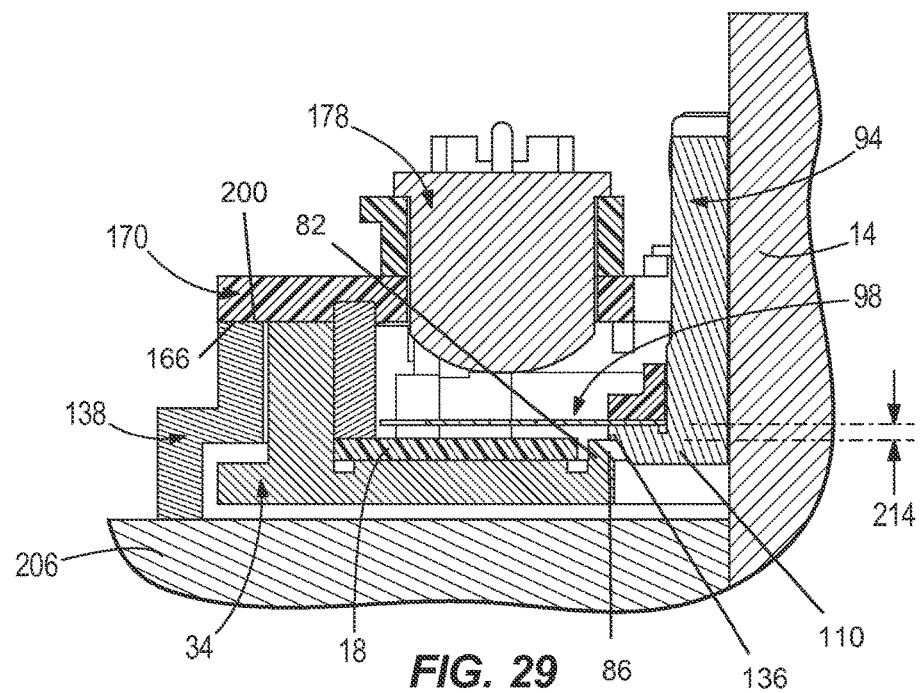
FIG. 29 is an enlarged, partial cross-sectional view of the second position, illustrating the relative positions of the sensor and disc.

With reference to FIGS. 27-29, after the first position has been obtained, the printed circuit board 170 and base 34 are rotated (e.g., as indicated by the arrow in FIG. 27) and lowered to a second position, in which the tabs 198 have moved off of the top surfaces 162 and down onto the surface 166 of the lip portion 154, such that the surfaces 200 contact the surfaces 166.

As illustrated in FIGS. 28 and 29, in the second position the sensor 18 and the disc 98 are separated by a gap 214 as measured along an axis parallel to that of central axes 90, 134. The gap 214 is larger than the gap 210.

The gap 214 falls within a desired operating range. In some constructions the gap 214 is approximately 0.015 inch. In some constructions the gap 214 is between approximately 0.005 inch and 0.100 inch. In some constructions, the gap is between approximately 0.010 and 0.030 inch. In some constructions the gap 214 is between approximately 0.010 inch and 0.020 inch. For the purposes of gap 214, the term approximately allows for a tolerance of plus or minus 0.002 inch. Other constructions include different values and ranges for the gap 214, including values less than 0.005 inch and greater than 0.100 inch.

During rotation and use of the shaft 14, the gap 214 is sufficient to allow for some axial movement (i.e., axial shifting) of the shaft 14. Specifically, the gap 214 is large enough to prevent the disc 98 and the sensor 18 from contacting one another in the event of axial movement of the shaft 14. While large enough to prevent contact between the disc 98 and the sensor 18, the gap 214 is also small enough that the quality of the sensed optical signal through the disc 98 remains sufficient for operation and use of the sensor 18.

During rotation and use of the shaft 14, it is also possible for the shaft 14 to have some radial run-out (i.e. to shift back and forth radially, as opposed to axially). In some constructions the system 10 is configured to account for radial run-out of up to, for example, 0.002 inch. Specifically, the optical sensing areas 30 are sized such that even if the disc 98 shifts radially during use by 0.002 inch, the light signals from the signal-generating emitter 178 will still be able to pass through the disc 98 and contact the appropriate optical sensing areas 30.

Figure 30:
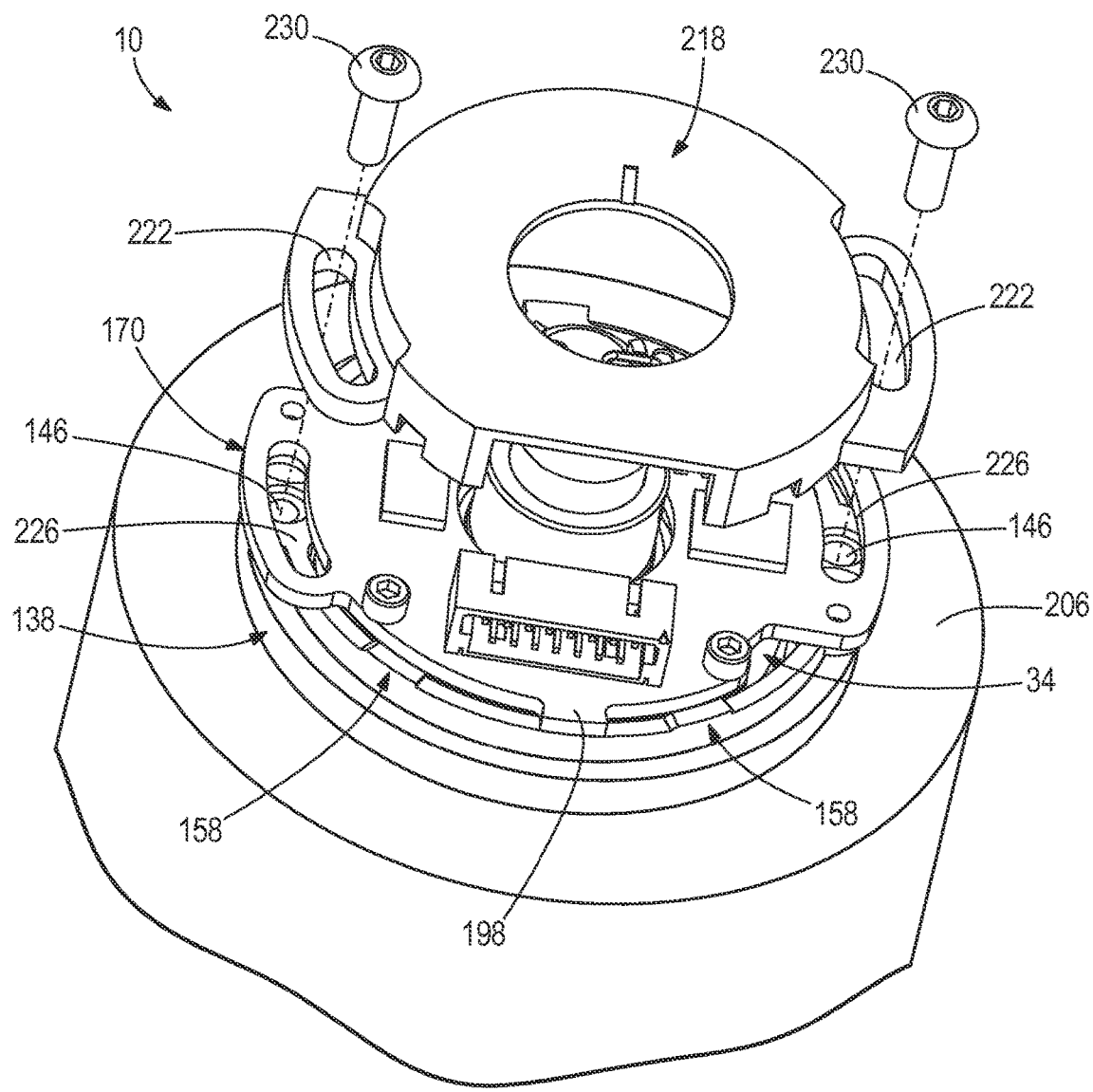
FIG. 30 is a top perspective view of a cover of the encoder system and the alignment ring.
Figure 31:
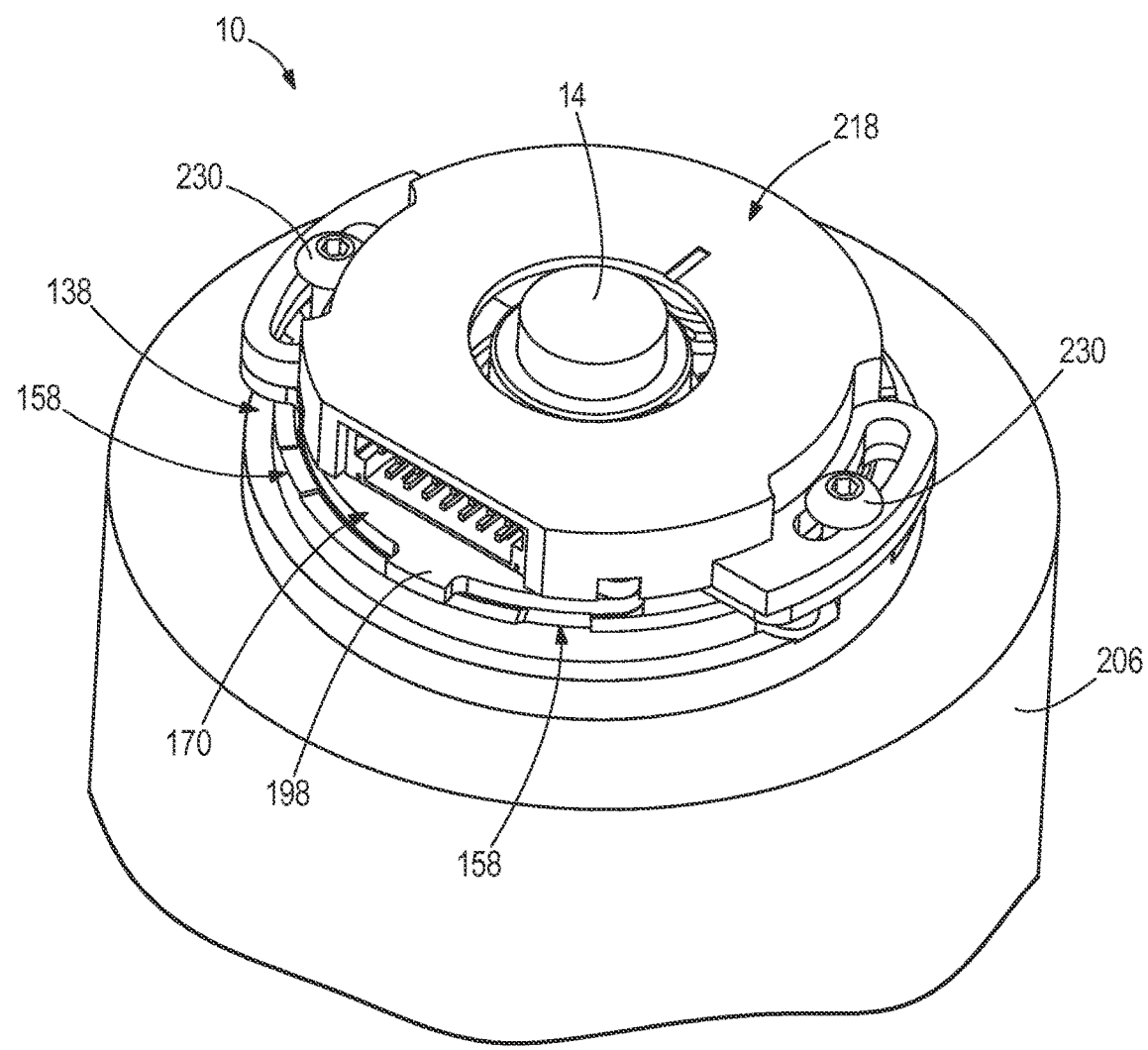
FIG. 31 is a top perspective view of the cover assembled to the alignment ring.

With reference to FIGS. 30 and 31, the system 10 also includes a cover 218 that is coupled to the alignment ring 138 and the printed circuit board 170. The cover 218 includes two slots 222. The slots 222 are aligned with slots 226 on the printed circuit board 170. While the illustrated constructions show the slots 226 on the printed circuit board 170, in other constructions the slots 226 may be on an element of the base assembly other than the printed circuit board 170 (e.g., on the base 34). The cover 218 and the printed circuit board 170 are able to rotate relative to the alignment ring 138 within the space provided in the slots 222, 226. This limited relative rotation allows for adjustment of commutation signals to motor windings (not shown) if desired, prior to final assembly. Once the adjustment of the commutation signals is complete, fasteners 230 are inserted through the slots 222, 226 and into the openings 146 on the alignment ring 138, to securely affix the cover 218, printed circuit board 170, and alignment ring 138 to one another.

Figure 32:
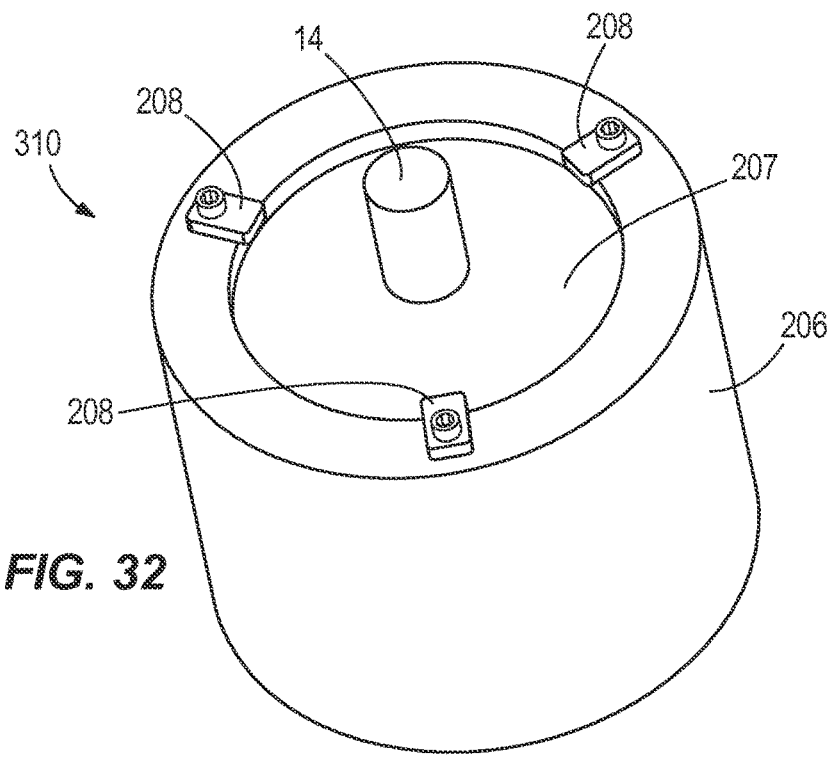
FIG. 32 is a top perspective view of a motor and shaft of an encoder system according to a second construction of the invention.
Figure 33:
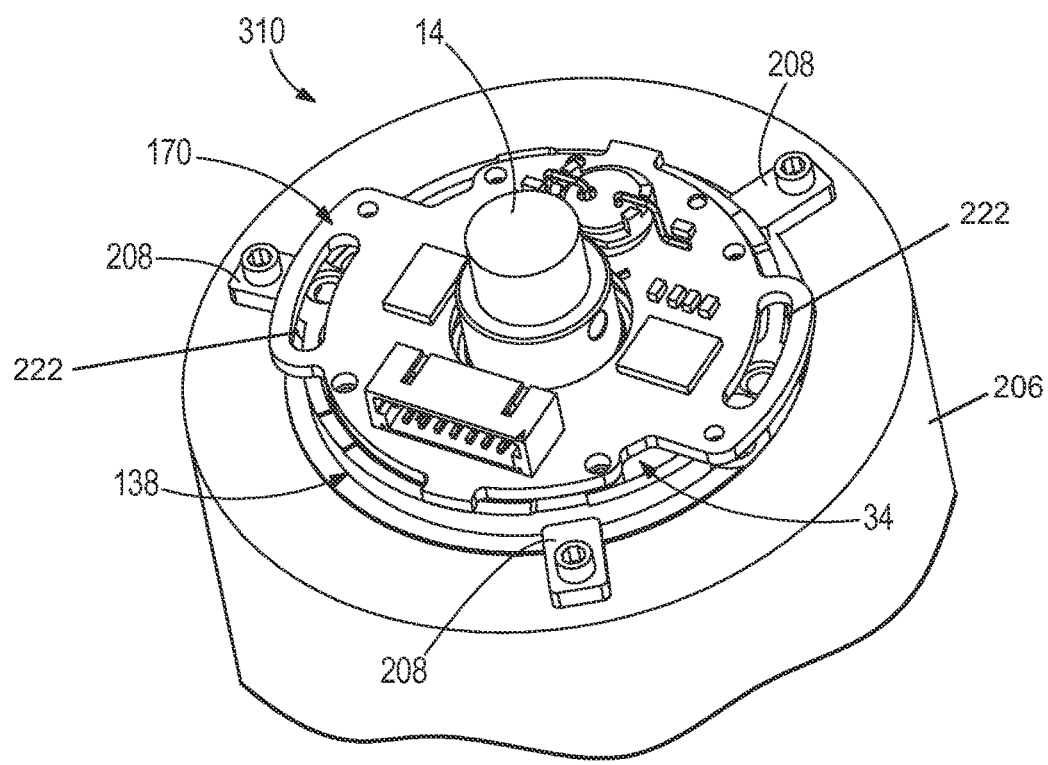
FIG. 33 is a top perspective view of the fully assembled encoder system of FIG. 32.

FIGS. 32 and 33 illustrate an encoder system 310 according to another construction. As illustrated in FIGS. 32 and 33, the encoder system 310 is similar to the system 10, except that the housing 206 includes a recessed area 207 surrounding the shaft 214, and clips 208 disposed adjacent the recessed area 207. The recessed area 207 receives the alignment ring 138.

With reference to FIG. 33, the alignment ring 138, printed circuit board 170, base 34, and hub 94 are fitted within the recessed area 207, and the clips 208 are used to help secure and hold the alignment ring 138 in place. The alignment of the hub 94 and the establishment of gap 214 are established in the same way as described above for system 10.

Additionally, similar to the encoder system 10, the slots 222 in the printed circuit board 170 provide limited relative rotation of the printed circuit board 170 about the axis 90, which allows for adjustment of commutation signals to motor windings (not shown) if desired prior to final assembly. Once the adjustment of the commutation signals is complete, fasteners (e.g., similar to fasteners 230 in FIG. 31) are used to securely affix the printed circuit board 170 to the alignment ring 138 and the housing 206. A cover (e.g., cover 218) may also be included and affixed to the printed circuit board 170 with the fasteners, similar to the encoder system 10.

Figure 34:
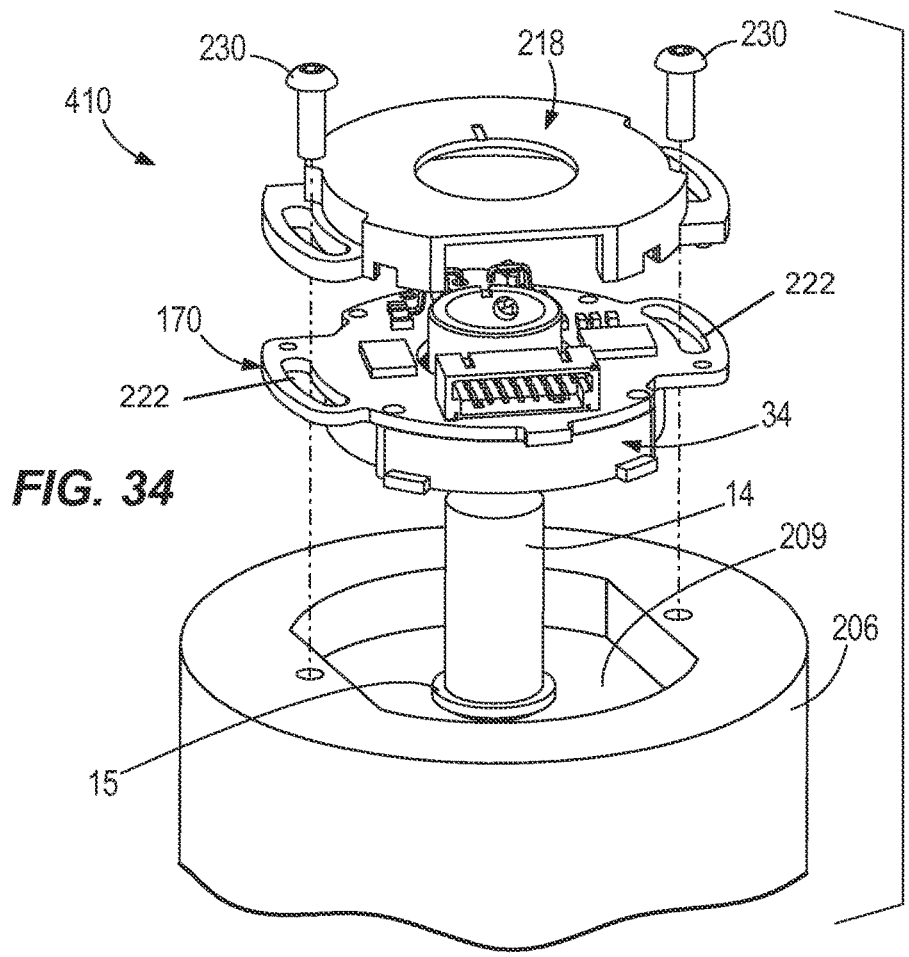
FIG. 34 is a top perspective view of an encoder system according to a third construction of the invention.

FIGS. 34-37 illustrate an encoder system 410 according to another construction. The system 410 includes the same base 34, hub 94, disc 98, printed circuit board 170 with slots 222, and cover 218 as that of systems 10 and 310. The system 410 does not include the alignment ring 138. Rather, the base 34 sits within a recessed area 209 in the housing 206. The recessed area 209 aligns (e.g., radially aligns) the base 34 to the axis 90. As illustrated in FIG. 34, fasteners 230 are used to couple the printed circuit board 170, base 34, and cover 218 to the housing 206.

Figure 36:
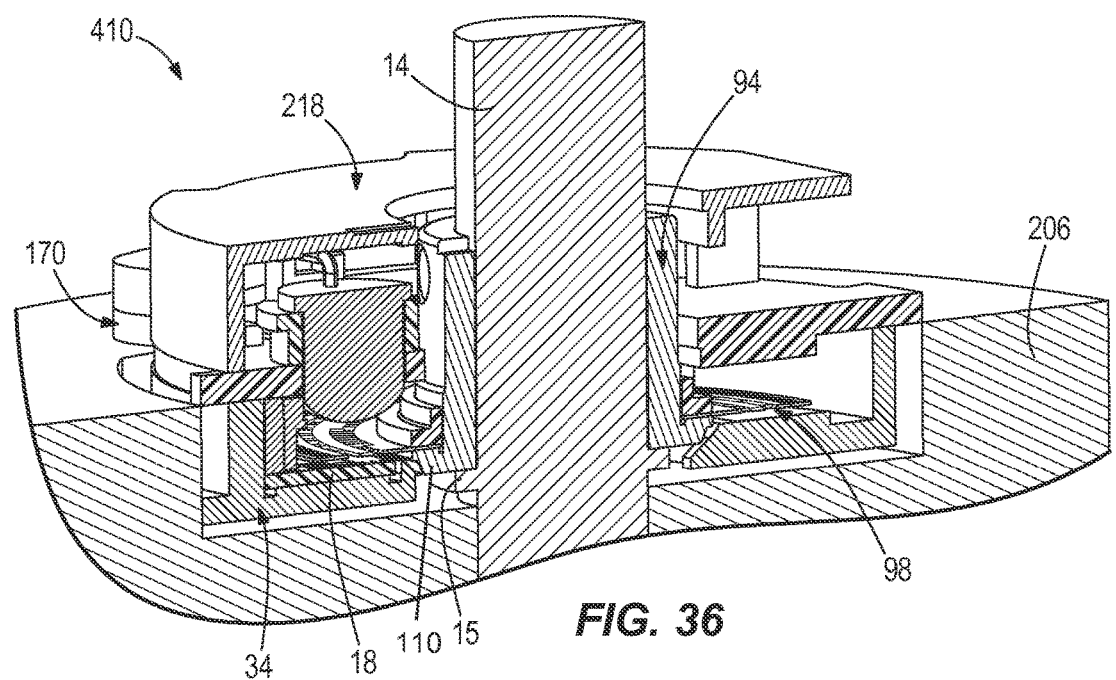
FIG. 36 is a cross-sectional view of the fully assembled encoder system of FIG. 34.
Figure 37:
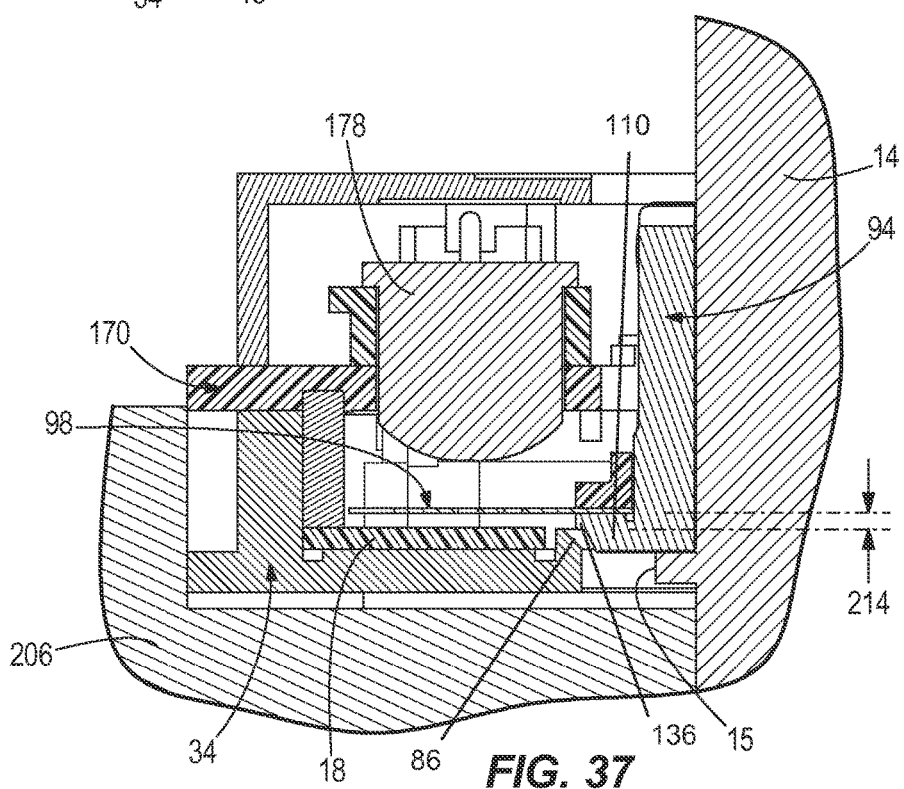
FIG. 37 is an enlarged, partial cross-sectional view of the fully assembled encoder system of FIG. 34.

To establish the same axial gap 214 as in systems 10 and 310, the shaft 14 includes a radially extending ledge 15 within the recessed area 209. As illustrated in FIGS. 36 and 37, when the system 410 is fully assembled, and pressed into the recessed area 209, the ledge 15 raises the hub 94 and disc 98 to a height relative the sensor 18 that establishes the same gap 214 created by the system 10.

Figure 35:
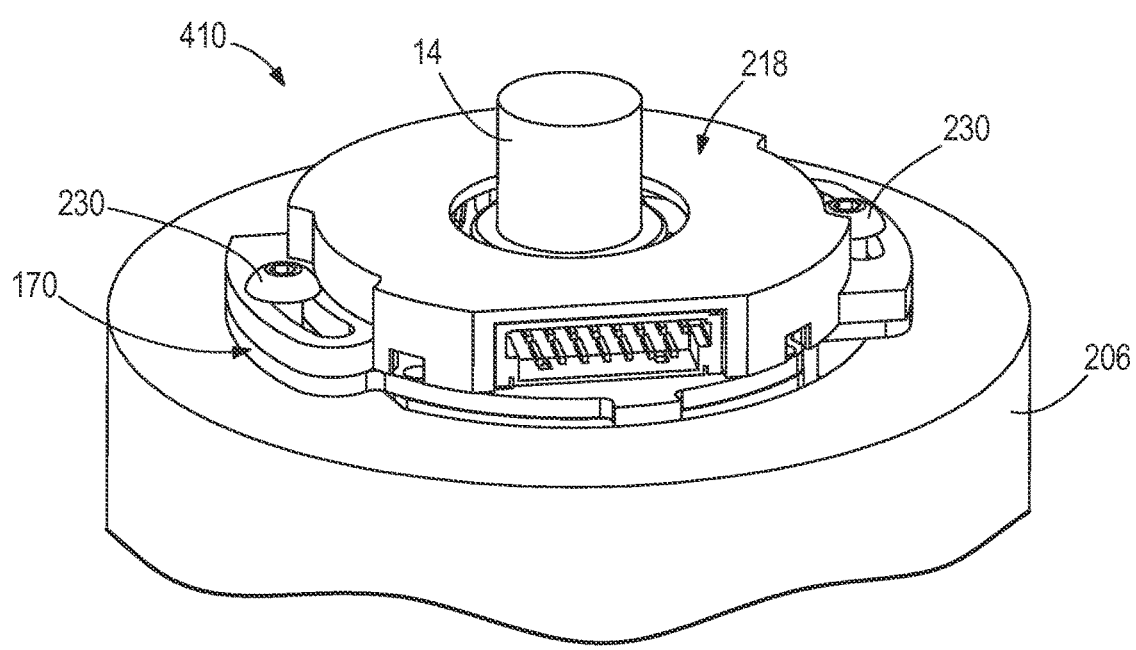
FIG. 35 is a top perspective view of the encoder system of FIG. 34, in a fully assembled state.

Similar to the encoder systems 10 and 310, the slots 222 in the printed circuit board 170 provide limited relative rotation of the printed circuit board 170 about the axis 90, which allows for adjustment of commutation signals to motor windings (not shown) if desired prior to final assembly. Once the adjustment of the commutation signals is complete, the fasteners 230 are used to securely affix the cover 218 and printed circuit board 170 to the housing 206 (FIG. 35).

The systems 10, 310, 410 described above may be used to establish a desired radial alignment and axial gap (i.e., gap 214) without the use of any bearings. Therefore, costs are kept to a minimum, and installation (as described above) may be performed quickly and efficiently. In addition, the system can be largely preassembled for installation at a later date without the need for complex and intricate alignments or assembly procedures.

As the shaft 14 rotates, and as light passes through the openings 102 in the disc 98, pulses of light are sent to the sensor 18 in the systems 10, 310, 410. The systems 10, 310, 410 may be used to measure approximately 1000 pulses of light per revolution of the shaft 14. In some constructions the systems 10, 310, 410 include an interpolation chip that facilitates an increase in the number of pulses that may be counted. Based on the multitude of pulses, a precise position, direction of rotation and/or speed of the shaft 14 may be determined.

In some constructions the sensing technology in the systems 10, 310, 410 (i.e., the sensor 18 and signal-generating emitter 178) may be magnetic, capacitave, or inductive in nature, as opposed to optical as described above.

Although the invention has been described in detail with reference to certain preferred embodiments, variations and modifications exist within the scope and spirit of one or more independent aspects of the invention as described.

What is claimed is:

1. An encoder system comprising:
a disc (98) coupled to a hub (94);
a sensible member (102) disposed on the disc;
a sensor (18) operable to cooperate with the sensible member to sense an operating parameter of the disc (98); and
a base assembly (34, 170, 18) movable relative to the hub, wherein the base assembly includes a tapered surface (86) at least partially defining an opening (78) through the base assembly, wherein the tapered surface remains stationary relative to a remainder of the base assembly at all times,
wherein the hub includes a surface (130, 136) that rests upon the tapered surface of the base assembly once the hub has been pressed down into the opening in the base assembly, so as to both radially align the sensor relative to the disc and axially align the hub relative to the base assembly,
wherein a portion of the sensor is coupled to the base assembly for co-movement with the base assembly and is movable between a first position in which the portion of the sensor is a first axial distance from the disc and a second position in which the portion of the sensor is a second axial distance from the disc, the second axial distance falling within a desired operating range.

2. The encoder system of claim 1, further comprising an alignment ring (138) having a second opening (142), wherein the hub (94) is positioned within the second opening, and wherein the base assembly (34, 170, 18) is movably coupled to the alignment ring.

3. The encoder system of claim 2, further comprising a shaft (14) and a housing (206) that houses the shaft, wherein the alignment ring is fixedly attached to the housing.

4. The encoder system of claim 3, wherein the hub includes an opening (114) that receives the shaft.

5. The encoder system of claim 2, wherein the alignment ring (138) includes a raised, upper lip portion including a first surface (162) and a second surface (166), the first surface (162) raised relative to the second surface (166).

6. The encoder system of claim 5, wherein the base assembly includes a third surface (200) that contacts the first surface when the sensor is in the first position and contacts the second surface when the sensor is in the second position.

7. The encoder system of claim 6, wherein the base includes a printed circuit board, and the third surface is disposed on the printed circuit board.

8. The encoder system of claim 6, wherein the base assembly includes a radially extending tab (198), the tab including the third surface.

9. The encoder system of claim 8, wherein the base assembly includes a printed circuit board, and the tab is disposed on the printed circuit board.

10. The encoder system of claim 1, further comprising an elastomeric electrical connector (26) coupled to the sensor (18), wherein the base assembly includes a printed circuit board (170) that includes a set of connector pads (174) that are coupled to the electrical connector (26) so as to transmit electricity between the printed circuit board (170) and the sensor (18), wherein the encoder system further includes a retainer (58) received by the base assembly, wherein the retainer (58) extends across a portion of the electrical connector (26) to constrain movement of the electrical connector (26).

11. The encoder system of claim 1, wherein the hub (94) includes a cylindrically-shaped top portion (106) and a cylindrically-shaped bottom portion (110), and wherein the disc is disposed between the top portion and the bottom portion.

12. The encoder system of claim 1, wherein the base assembly (34, 170, 18) includes a base (34) that includes the opening (78).

13. The encoder system of claim 12, wherein the base (34) includes the tapered surface (86).

14. The encoder system of claim 13, wherein the surface (130, 136) of the hub contacts the tapered surface of the base when the sensor is in the first position.

15. The encoder system of claim 14, wherein the surface of the hub is spaced from the tapered surface of the base when the sensor is in the second position.

16. The encoder system of claim 1, wherein the desired operating range is between 0.010 and 0.030 inches.

17. The encoder system of claim 1, further comprising a shaft (14) received within an opening of the hub, the shaft including a ledge (15) that engages the hub.

18. A method of assembling an encoder system, the method comprising:
connecting a disc to a hub for co-rotation about an axis, the disc including a sensible element;
positioning a sensor in an assembly position adjacent the sensible element;
supporting the sensor using a base assembly;
both radially aligning the sensor relative to the disc and axially aligning the hub relative to the base assembly by pressing the hub downwardly into an opening of the base assembly until a surface (130, 136) of the hub rests on a tapered surface (86) of the base assembly, the tapered surface at least partially defining the opening of the base assembly and remaining stationary relative to a remainder of the base assembly at all times;
moving the base assembly from a first position in which the sensor is in the assembly position to a second position in which the sensor is in an operating position and is spaced axially from the disc.

19. The method of claim 18, wherein moving the base assembly includes rotating the base assembly about the axis.

20. The method of claim 18, wherein moving the base assembly includes moving the base assembly along the axis.

21. The method of claim 18, wherein the encoder system includes an alignment ring, and moving the base assembly includes moving the base assembly from contacting a first surface on the alignment ring to contacting a second surface on the alignment ring.

22. The method of claim 18, wherein the base assembly includes a printed circuit board.

23. The method of claim 18, wherein the sensor is spaced between 0.005 inches and 0.100 inches axially from the disc in the second position.

24. The method of claim 18, wherein the sensor is spaced between 0.010 and 0.030 inches axially from the disc in the second position.

25. The method of claim 18, wherein the step of moving the base assembly includes positioning the base assembly over a shaft, the shaft including a ledge (15) that engages the hub, and subsequently pressing the base assembly to move the base assembly axially while the hub remains axially restrained by the ledge.

26. The method of claim 21, further comprising fixing the alignment ring to a motor housing after the step of radially aligning the sensor relative to the disc and axially aligning the hub relative to the base assembly, and prior to the step of moving the base assembly from contacting a first surface on the alignment ring to contacting a second surface on the alignment ring.

\* \* \* \* \*